(12) United States Patent
Walker et al.

(10) Patent No.: US 7,885,726 B2
(45) Date of Patent: *Feb. 8, 2011

(54) VENDING MACHINE SYSTEM AND METHOD FOR ENCOURAGING THE PURCHASE OF PROFITABLE ITEMS

(75) Inventors: Jay S. Walker, Ridgefield, CT (US); Daniel E. Tedesco, New Canaan, CT (US); Andrew S. Van Luchene, Norwalk, CT (US); Keith Bemer, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/456,355

(22) Filed: Jul. 10, 2006

(65) Prior Publication Data

US 2006/0241966 A1    Oct. 26, 2006

Related U.S. Application Data

(63) Continuation of application No. 09/345,092, filed on Jun. 30, 1999, now Pat. No. 7,249,050, which is a continuation-in-part of application No. 09/164,670, filed on Oct. 1, 1998, now Pat. No. 6,324,520, which is a continuation-in-part of application No. 09/012,163, filed on Jan. 22, 1998, now Pat. No. 6,397,193, which is a continuation-in-part of application No. 08/947,798, filed on Oct. 9, 1997, and a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(51) Int. Cl.
G06F 17/00 (2006.01)

(52) U.S. Cl. ............ 700/240; 700/238; 700/236; 700/232; 705/14.37; 705/22; 705/16

(58) Field of Classification Search ......... 700/231–244; 705/1–45, 50–80, 400–418, 500

See application file for complete search history.

(56) References Cited

U.S. PATENT DOCUMENTS 2,607,463 A    8/1952    Saigh (Continued)

FOREIGN PATENT DOCUMENTS

CA    2070736 A1    6/1992

(Continued)

OTHER PUBLICATIONS

Office Action for U.S. Appl. No. 09/345,092 dated Jan. 24, 2002, 37pp.

(Continued)

*Primary Examiner* — Gene Crawford
*Assistant Examiner* — Michael K Collins
(74) *Attorney, Agent, or Firm* — Fincham Downs, LLC; Carson C. K. Fincham

(57) ABSTRACT

This invention relates generally to systems and methods for delivering products-on-demand to individuals and, more particularly, to delivery via vending machines. In accordance with a preferred embodiment, the method of the instant invention is initiated when a customer makes an initial product selection. Based the customer's product choice, a determination is made as to whether or not that product qualifies for an alternate product offer. If it does not so qualify, the customer's original selection will be dispensed and the transaction ends. On the other hand, if the product does so qualify, the customer will be presented with an offer message that suggests that he or she should try an alternative product. Typically, the product that is offered as an alternative will be the one whose sale is most beneficial to the vending machine operator, e.g., the one yielding the greatest profit. If the customer accepts the alternate offer, the alternate product will be dispensed. However, if the customer declines the alternate product offer, the originally requested item will be vended. The particular circumstances under which an alternate product offer is presented to the customer are quantified by representing them as a collection of rules, the evaluation of which depends preferably on previously collected sales data.

58 Claims, 5 Drawing Sheets

U.S. PATENT DOCUMENTS

| | | | |
|---|---|---|---|
| 3,442,422 A * | 5/1969 | Neidig | 221/94 |
| 3,442,442 A | 5/1969 | Neidig | |
| 3,573,747 A | 4/1971 | Adams | |
| 3,691,527 A | 9/1972 | Yamamoto | |
| 3,705,348 A | 12/1972 | Wahlberg | |
| 3,705,384 A | 12/1972 | Wahlberg | |
| 3,747,733 A | 7/1973 | Knickerbocker | |
| 3,937,929 A | 2/1976 | Knauer | |
| 4,008,792 A | 2/1977 | Levasseur | |
| RE29,450 E | 10/1977 | Goldsby | |
| 4,108,361 A | 8/1978 | Krause | |
| 4,157,829 A | 6/1979 | Goldman | |
| 4,237,537 A | 12/1980 | Pitches | |
| 4,245,730 A | 1/1981 | Bachmann | |
| 4,258,837 A | 3/1981 | Manos | |
| 4,282,575 A | 8/1981 | Hoskinson | |
| 4,316,532 A | 2/1982 | Levasseur | |
| 4,323,770 A | 4/1982 | Dieulot | |
| 4,341,951 A | 7/1982 | Benton | |
| 4,359,147 A | 11/1982 | Levasseur | |
| 4,376,479 A | 3/1983 | Sugimoto | |
| 4,412,292 A | 10/1983 | Sedam | |
| 4,420,751 A | 12/1983 | Paganini | |
| 4,441,160 A | 4/1984 | Azcua | |
| 4,478,353 A | 10/1984 | Levasseur | |
| 4,494,197 A | 1/1985 | Troy | |
| 4,498,570 A | 2/1985 | King | |
| 4,500,880 A | 2/1985 | Gomersall | |
| 4,518,098 A | 5/1985 | Fleischer | |
| 4,551,935 A | 11/1985 | Bachmann | |
| 4,554,446 A | 11/1985 | Murphy | |
| 4,567,609 A | 1/1986 | Metcalf | |
| 4,574,947 A | 3/1986 | Hutchings | |
| RE32,115 E * | 4/1986 | Lockwood et al. | 235/381 |
| 4,593,298 A | 6/1986 | Hayashi et al. | |
| 4,593,361 A | 6/1986 | Otten | |
| 4,598,378 A | 7/1986 | Giacomo | |
| 4,598,810 A | 7/1986 | Shore et al. | |
| 4,603,390 A | 7/1986 | Mehdipour | |
| 4,628,193 A | 12/1986 | Blum | |
| 4,636,963 A | 1/1987 | Nakajima et al. | |
| 4,639,875 A | 1/1987 | Abraham | |
| 4,654,513 A | 3/1987 | Hennessy | |
| 4,654,800 A | 3/1987 | Hayashi | |
| 4,668,150 A | 5/1987 | Blumberg | |
| 4,669,730 A | 6/1987 | Small | |
| 4,677,553 A | 6/1987 | Roberts | |
| 4,679,150 A | 7/1987 | Hayashi | |
| 4,689,742 A | 8/1987 | Troy | |
| 4,723,212 A | 2/1988 | Mindrum | |
| 4,734,858 A | 3/1988 | Schlafly | |
| 4,736,096 A | 4/1988 | Ushikubo | |
| 4,737,910 A | 4/1988 | Kimbrow | |
| 4,743,022 A | 5/1988 | Wood | |
| 4,760,247 A | 7/1988 | Keanne | |
| 4,766,548 A | 8/1988 | Cedrone | |
| 4,799,156 A | 1/1989 | Shavit | |
| 4,815,741 A | 3/1989 | Small | |
| 4,817,166 A | 3/1989 | Gonzalez | |
| 4,817,990 A | 4/1989 | Krost | |
| 4,825,045 A | 4/1989 | Humble | |
| 4,833,308 A | 5/1989 | Humble | |
| 4,833,607 A | 5/1989 | Dethloff | |
| 4,834,231 A | 5/1989 | Awane | |
| 4,839,507 A | 6/1989 | May | |
| 4,854,590 A | 8/1989 | Jolliff | |
| 4,857,840 A | 8/1989 | Lanchais | |
| 4,859,838 A | 8/1989 | Okiharu | |
| 4,872,113 A | 10/1989 | Dinerstein | |
| 4,876,592 A | 10/1989 | Von Kohorn | |
| 4,878,248 A | 10/1989 | Shyu | |
| 4,882,473 A | 11/1989 | Bergeron | |
| 4,882,675 A | 11/1989 | Nichtberger | |
| 4,899,906 A | 2/1990 | Bella | |
| 4,902,880 A | 2/1990 | Garczynski | |
| 4,906,828 A | 3/1990 | Halpern | |
| 4,908,761 A | 3/1990 | Tai | |
| 4,910,672 A | 3/1990 | Off | |
| 4,915,205 A | 4/1990 | Reid et al. | |
| 4,922,435 A | 5/1990 | Cahlander | |
| 4,922,522 A | 5/1990 | Scanlon | |
| 4,937,853 A | 6/1990 | Brule | |
| 4,947,028 A | 8/1990 | Gorog | |
| 4,963,723 A | 10/1990 | Masada | |
| 4,973,952 A | 11/1990 | Malec | |
| 4,982,337 A | 1/1991 | Burr | |
| 4,982,346 A | 1/1991 | Giruard | |
| 4,992,940 A | 2/1991 | Dworkin | |
| 4,993,714 A | 2/1991 | Golightly | |
| 4,999,763 A | 3/1991 | Ousborne | |
| 5,010,485 A | 4/1991 | Bigari | |
| 5,025,372 A | 6/1991 | Burton | |
| 5,029,098 A | 7/1991 | Levasseur | |
| 5,034,739 A | 7/1991 | Gruhl | |
| 5,036,472 A * | 7/1991 | Buckley et al. | 700/233 |
| 5,039,848 A | 8/1991 | Stoken | |
| 5,056,019 A | 10/1991 | Schultz | |
| 5,058,044 A | 10/1991 | Stewart | |
| 5,064,999 A | 11/1991 | Okamoto | |
| 5,081,685 A | 1/1992 | Jones, III | |
| 5,083,638 A | 1/1992 | Schneider | |
| 5,091,713 A | 2/1992 | Horne | |
| 5,112,050 A | 5/1992 | Koza et al. | |
| 5,117,354 A | 5/1992 | Long | |
| 5,117,407 A | 5/1992 | Vogel | |
| 5,119,295 A | 6/1992 | Kapur | |
| 5,128,861 A | 7/1992 | Kagami | |
| 5,128,862 A | 7/1992 | Mueller | |
| 5,132,914 A | 7/1992 | Cahlander | |
| 5,136,658 A | 8/1992 | Mori | |
| 5,158,293 A | 10/1992 | Mullins | |
| 5,172,328 A | 12/1992 | Cahlander | |
| 5,173,851 A | 12/1992 | Off | |
| 5,176,224 A | 1/1993 | Spector | |
| 5,177,342 A | 1/1993 | Adams | |
| 5,185,695 A | 2/1993 | Pruchnicki | |
| 5,186,463 A | 2/1993 | Marin | |
| 5,189,607 A | 2/1993 | Shirasaki | |
| 5,191,410 A | 3/1993 | McCalley | |
| 5,192,854 A | 3/1993 | Counts | |
| 5,193,648 A | 3/1993 | Yuter | |
| 5,200,889 A | 4/1993 | Mori | |
| 5,201,010 A | 4/1993 | Deaton | |
| 5,202,826 A | 4/1993 | McCarthy | |
| 5,204,675 A | 4/1993 | Sekine | |
| 5,216,595 A | 6/1993 | Protheroe | |
| 5,223,698 A | 6/1993 | Kapur | |
| 5,231,569 A | 7/1993 | Myatt | |
| 5,239,165 A | 8/1993 | Novak | |
| 5,243,515 A | 9/1993 | Lee | |
| 5,243,652 A | 9/1993 | Teare | |
| 5,245,533 A | 9/1993 | Marshall | |
| 5,250,789 A | 10/1993 | Johnsen | |
| 5,253,165 A | 10/1993 | Leiseca | |
| 5,256,863 A | 10/1993 | Ferguson | |
| 5,257,179 A | 10/1993 | DeMar | |
| 5,262,941 A | 11/1993 | Saladin | |
| 5,267,452 A | 12/1993 | Zinsmeyer | |
| 5,269,521 A | 12/1993 | Rossides | |
| 5,274,547 A | 12/1993 | Zoffel | |
| 5,276,312 A | 1/1994 | McCarthy | |
| 5,283,731 A | 2/1994 | Lalonde | |
| 5,287,267 A | 2/1994 | Srinivasan | |
| 5,287,268 A | 2/1994 | McCarthy | |

| | | | | | |
|---|---|---|---|---|---|
| 5,295,064 A | 3/1994 | Malec | 5,612,868 A | 3/1997 | Off |
| 5,297,026 A | 3/1994 | Hoffman | 5,613,620 A | 3/1997 | Center |
| 5,297,031 A | 3/1994 | Gutterman | 5,613,679 A | 3/1997 | Casa |
| 5,302,811 A | 4/1994 | Fukatsu | 5,615,109 A | 3/1997 | Eder |
| 5,305,195 A | 4/1994 | Murphy | 5,615,268 A | 3/1997 | Micali |
| 5,309,355 A | 5/1994 | Lockwood | 5,615,269 A | 3/1997 | Micali |
| 5,315,093 A | 5/1994 | Stewart | 5,619,558 A | 4/1997 | Jheeta |
| 5,315,664 A | 5/1994 | Kumagai | 5,620,079 A | 4/1997 | Molbak |
| 5,319,542 A | 6/1994 | King, Jr. | 5,621,201 A | 4/1997 | Langhans |
| 5,325,291 A | 6/1994 | Garrett | 5,621,640 A | 4/1997 | Burke |
| 5,339,250 A | 8/1994 | Durbin | 5,621,812 A | 4/1997 | Deaton |
| 5,345,071 A | 9/1994 | Dumont | 5,630,357 A | 5/1997 | Akiyama |
| 5,353,218 A | 10/1994 | De Lapa | 5,631,724 A | 5/1997 | Sawada |
| 5,353,219 A | 10/1994 | Mueller | 5,632,010 A | 5/1997 | Briechle |
| 5,361,871 A | 11/1994 | Gupta | 5,637,859 A | 6/1997 | Menoud |
| 5,367,452 A | 11/1994 | Gallery | 5,638,302 A | 6/1997 | Gerber |
| 5,368,129 A | 11/1994 | Von Kohorn | 5,638,457 A | 6/1997 | Deaton |
| 5,371,796 A | 12/1994 | Avarne | 5,642,484 A | 6/1997 | Harrison, III et al. |
| 5,380,991 A | 1/1995 | Valencia | 5,642,485 A | 6/1997 | Deaton |
| 5,381,155 A | 1/1995 | Gerber | 5,644,723 A | 7/1997 | Deaton |
| 5,383,111 A | 1/1995 | Homma | 5,645,486 A | 7/1997 | Nagao |
| 5,398,932 A | 3/1995 | Eberhardt | 5,649,114 A | 7/1997 | Deaton |
| RE34,915 E | 4/1995 | Nichtberger | 5,651,075 A | 7/1997 | Frazier |
| 5,408,417 A | 4/1995 | Wilder | 5,652,421 A | 7/1997 | Veeneman |
| 5,415,264 A | 5/1995 | Menoud | 5,655,007 A | 8/1997 | McAllister |
| 5,417,424 A | 5/1995 | Snowden | 5,664,115 A | 9/1997 | Fraser |
| 5,420,606 A | 5/1995 | Begum | 5,665,953 A | 9/1997 | Mazzamuto |
| 5,422,473 A | 6/1995 | Kamata | 5,666,493 A | 9/1997 | Wojcik |
| 5,425,108 A | 6/1995 | Hwang | 5,675,662 A | 10/1997 | Deaton |
| 5,434,394 A | 7/1995 | Roach | 5,685,435 A | 11/1997 | Picioccio |
| 5,448,471 A | 9/1995 | Deaton | 5,687,087 A | 11/1997 | Taggart |
| 5,450,938 A | 9/1995 | Rademacher | 5,687,322 A | 11/1997 | Deaton |
| 5,452,344 A | 9/1995 | Larson | 5,692,132 A | 11/1997 | Hogan |
| 5,459,306 A | 10/1995 | Stein | 5,701,252 A | 12/1997 | Facchin |
| 5,467,892 A | 11/1995 | Schlamp | 5,708,782 A | 1/1998 | Larson |
| 5,475,205 A | 12/1995 | Behm | 5,710,557 A | 1/1998 | Schette |
| 5,481,094 A | 1/1996 | Suda | 5,710,886 A | 1/1998 | Christiansen |
| 5,482,139 A | 1/1996 | Rivalto | 5,710,887 A | 1/1998 | Chelliah |
| 5,495,412 A | 2/1996 | Thiessen | 5,713,795 A | 2/1998 | Kohorn |
| 5,504,475 A | 4/1996 | Houdou | 5,717,866 A | 2/1998 | Naftger |
| 5,504,675 A | 4/1996 | Cragun | 5,719,396 A | 2/1998 | Jack |
| 5,505,449 A | 4/1996 | Eberhardt | 5,724,886 A | 3/1998 | Ewald |
| 5,510,979 A | 4/1996 | Moderi | 5,726,450 A | 3/1998 | Peterson |
| 5,511,646 A | 4/1996 | Maldanis | 5,727,163 A | 3/1998 | Bezos |
| 5,513,117 A | 4/1996 | Small | 5,727,164 A | 3/1998 | Kaye |
| 5,518,239 A | 5/1996 | Johnston | 5,732,398 A | 3/1998 | Tagswa |
| 5,521,364 A | 5/1996 | Kimura | 5,732,950 A | 3/1998 | Moody |
| 5,526,257 A | 6/1996 | Lerner | 5,734,150 A | 3/1998 | Brown |
| 5,536,045 A | 7/1996 | Adams | 5,734,838 A | 3/1998 | Robinson |
| 5,537,314 A | 7/1996 | Kanter | 5,737,710 A | 4/1998 | Anthonyson |
| 5,539,189 A | 7/1996 | Wilson | 5,739,512 A | 4/1998 | Tognazzini |
| 5,544,040 A | 8/1996 | Gerbaulet | 5,754,653 A | 5/1998 | Canfield |
| 5,544,784 A | 8/1996 | Malaspina | 5,758,328 A | 5/1998 | Giovannoli |
| 5,546,316 A | 8/1996 | Buckley | 5,761,648 A | 6/1998 | Golden |
| 5,548,110 A | 8/1996 | Storch | 5,768,142 A | 6/1998 | Jacobs |
| 5,550,746 A | 8/1996 | Jacobs | 5,768,382 A | 6/1998 | Schneier |
| 5,557,721 A | 9/1996 | Fite | 5,769,269 A | 6/1998 | Peters |
| 5,564,546 A | 10/1996 | Molbak et al. | 5,772,510 A | 6/1998 | Roberts |
| 5,564,977 A | 10/1996 | Algie | 5,774,868 A | 6/1998 | Cragun |
| 5,568,406 A | 10/1996 | Gerber | 5,774,870 A | 6/1998 | Storey |
| 5,572,653 A | 11/1996 | DeTemple | 5,774,874 A | 6/1998 | Veeneman |
| 5,581,064 A | 12/1996 | Riley | 5,780,133 A | 7/1998 | Engstrom |
| 5,591,972 A | 1/1997 | Noble | 5,791,990 A | 8/1998 | Schroeder |
| 5,592,375 A | 1/1997 | Salmon | 5,791,991 A | 8/1998 | Small |
| 5,592,376 A | 1/1997 | Hodroff | 5,794,207 A | 8/1998 | Walker et al. |
| 5,592,378 A * | 1/1997 | Cameron et al. ............... 705/27 | 5,799,086 A | 8/1998 | Sudia |
| 5,596,501 A | 1/1997 | Comer | 5,799,284 A | 8/1998 | Bourquin |
| 5,602,377 A | 2/1997 | Beller | 5,802,015 A | 9/1998 | Rothschild |
| 5,604,901 A | 2/1997 | Kelley | 5,806,044 A | 9/1998 | Powell |
| 5,608,643 A | 3/1997 | Wichter | 5,809,144 A | 9/1998 | Sirbu |
| 5,611,051 A | 3/1997 | Pirelli | 5,816,918 A | 10/1998 | Kelley |
| 5,611,052 A | 3/1997 | Dykstra | 5,819,981 A | 10/1998 | Cox |
| 5,612,527 A | 3/1997 | Ovadia | 5,822,216 A | 10/1998 | Satchell, Jr. |

| | | | | | | |
|---|---|---|---|---|---|---|
| 5,822,735 A * | 10/1998 | De Lapa et al. ............... 705/14 | | 6,058,373 A | 5/2000 | Blinn |
| 5,822,736 A | 10/1998 | Hartman | | 6,058,375 A | 5/2000 | Park |
| 5,831,862 A | 11/1998 | Hetrick | | 6,061,660 A | 5/2000 | Eggleston |
| 5,832,457 A | 11/1998 | O'Brien | | 6,064,987 A | 5/2000 | Walker et al. |
| 5,832,458 A | 11/1998 | Jones | | 6,070,147 A | 5/2000 | Harms et al. |
| 5,835,896 A | 11/1998 | Fisher | | 6,073,840 A | 6/2000 | Marion |
| 5,842,178 A | 11/1998 | Giovannoli | | 6,076,070 A | 6/2000 | Stack |
| 5,842,212 A | 11/1998 | Ballurio | | 6,078,866 A | 6/2000 | Buck |
| 5,844,808 A | 12/1998 | Konsmo | | 6,078,893 A | 6/2000 | Ouimet et al. |
| 5,845,259 A | 12/1998 | West | | 6,080,062 A | 6/2000 | Olson |
| 5,845,265 A | 12/1998 | Woolston | | 6,085,768 A | 7/2000 | Mori |
| 5,845,577 A | 12/1998 | Nelson et al. | | 6,101,485 A | 8/2000 | Fortenberry |
| 5,848,399 A | 12/1998 | Burke | | 6,112,191 A | 8/2000 | Burke |
| 5,850,446 A | 12/1998 | Berger | | 6,115,649 A | 9/2000 | Sakata |
| 5,855,007 A | 12/1998 | Jovicic | | 6,119,099 A | 9/2000 | Walker |
| 5,857,175 A | 1/1999 | Day | | 6,131,085 A | 10/2000 | Rossides |
| 5,864,604 A | 1/1999 | Moen | | 6,134,534 A | 10/2000 | Walker |
| 5,864,822 A | 1/1999 | Baker, III | | 6,138,105 A | 10/2000 | Walker et al. |
| 5,870,716 A | 2/1999 | Sugiyama | | 6,161,059 A * | 12/2000 | Tedesco et al. ............... 700/232 |
| 5,870,717 A | 2/1999 | Wiecha | | 6,167,382 A | 12/2000 | Sparks |
| 5,870,719 A | 2/1999 | Maritzen | | 6,192,349 B1 | 2/2001 | Husemann |
| 5,873,069 A | 2/1999 | Reuhl | | 6,193,154 B1 | 2/2001 | Phillips |
| 5,875,110 A | 2/1999 | Jacobs | | 6,193,155 B1 | 2/2001 | Walker |
| 5,878,139 A | 3/1999 | Rosen | | 6,205,435 B1 | 3/2001 | Biffar |
| 5,878,401 A | 3/1999 | Joseph | | 6,223,163 B1 * | 4/2001 | Van Luchene ............... 705/1 |
| 5,883,810 A | 3/1999 | Franklin | | 6,236,971 B1 | 5/2001 | Stefik |
| 5,887,271 A | 3/1999 | Powell | | 6,243,691 B1 | 6/2001 | Fisher |
| 5,890,136 A | 3/1999 | Kipp | | 6,247,047 B1 | 6/2001 | Wolff |
| 5,890,718 A | 4/1999 | Byon | | 6,249,772 B1 | 6/2001 | Walker |
| 5,905,246 A | 5/1999 | Fajkowski | | 6,260,024 B1 | 7/2001 | Shkedy |
| 5,907,830 A | 5/1999 | Engel | | 6,266,651 B1 | 7/2001 | Woolston |
| 5,918,213 A | 6/1999 | Bernard | | 6,267,670 B1 * | 7/2001 | Walker et al. ............... 463/17 |
| 5,924,078 A | 7/1999 | Naftzger | | 6,292,786 B1 | 9/2001 | Deaton et al. |
| 5,924,080 A | 7/1999 | Johnson | | 6,296,569 B1 | 10/2001 | Congello, Jr. |
| 5,924,082 A | 7/1999 | Silverman | | 6,298,329 B1 | 10/2001 | Walker et al. |
| 5,926,796 A * | 7/1999 | Walker et al. ............... 705/16 | | 6,298,331 B1 | 10/2001 | Walker et al. |
| 5,930,145 A | 7/1999 | Yuyama | | 6,307,958 B1 | 10/2001 | Deaton et al. |
| 5,930,771 A | 7/1999 | Stapp | | 6,321,201 B1 | 11/2001 | Dahl |
| 5,937,391 A | 8/1999 | Ikeda | | 6,321,984 B1 | 11/2001 | McCall |
| 5,938,717 A | 8/1999 | Dunne | | 6,324,520 B1 * | 11/2001 | Walker et al. ............... 705/16 |
| 5,946,665 A | 8/1999 | Suzuki et al. | | 6,330,544 B1 | 12/2001 | Walker |
| 5,947,328 A | 9/1999 | Kovens | | 6,370,513 B1 | 4/2002 | Kolawa |
| 5,948,038 A | 9/1999 | Daly | | 6,401,009 B1 * | 6/2002 | Chandonnet ............... 700/231 |
| 5,956,695 A | 9/1999 | Carrithers | | 6,405,174 B1 | 6/2002 | Walker |
| 5,959,869 A | 9/1999 | Miller | | 6,467,686 B1 | 10/2002 | Guthrie |
| 5,963,452 A | 10/1999 | Etoh | | 6,512,570 B2 | 1/2003 | Garfinkle |
| 5,963,939 A | 10/1999 | McCann | | 6,582,304 B2 | 6/2003 | Walker et al. |
| 5,964,660 A | 10/1999 | James | | 6,584,448 B1 | 6/2003 | Laor |
| 5,970,469 A | 10/1999 | Scoggie | | 6,587,031 B1 | 7/2003 | Daugherty et al. |
| 5,974,399 A | 10/1999 | Giuliani | | 6,598,024 B1 | 7/2003 | Walker et al. |
| 5,988,346 A | 11/1999 | Tedesco | | 6,684,195 B1 | 1/2004 | Deaton |
| 5,991,740 A | 11/1999 | Messer | | 6,887,153 B2 | 5/2005 | Walker et al. |
| 5,995,942 A | 11/1999 | Smith | | 6,970,837 B1 | 11/2005 | Walker |
| 5,997,236 A | 12/1999 | Picioccio | | 7,107,221 B1 * | 9/2006 | Tracy et al. ............... 705/1 |
| 5,997,928 A | 12/1999 | Kaish | | 7,249,050 B1 * | 7/2007 | Walker et al. ............... 705/14 |
| 5,999,914 A | 12/1999 | Blinn | | 2002/0120496 A1 | 8/2002 | Scroggie |
| 6,012,834 A | 1/2000 | Dueck | | 2003/0033292 A1 | 2/2003 | Meisel |
| 6,014,634 A | 1/2000 | Scroggie | | 2003/0088465 A1 | 5/2003 | Monteverde |
| 6,016,504 A | 1/2000 | Arnold | | 2003/0139969 A1 | 7/2003 | Scroggie |
| 6,017,157 A | 1/2000 | Garfinkle | | 2003/0207708 A1 | 11/2003 | Sadri et al. |
| 6,021,394 A | 2/2000 | Takahashi | | 2004/0243478 A1 | 12/2004 | Walker |
| 6,024,288 A | 2/2000 | Gottlich et al. | | 2006/0100008 A1 | 5/2006 | Wright et al. |
| 6,026,370 A | 2/2000 | Jermyn | | | | |
| 6,026,375 A | 2/2000 | Hall | | FOREIGN PATENT DOCUMENTS | | |
| 6,029,139 A | 2/2000 | Cunningham | | CA | 2217739 | 4/1996 |
| 6,029,141 A | 2/2000 | Bezos | | DE | 4009980 A1 | 1/1991 |
| 6,035,284 A | 3/2000 | Straub | | DE | 4037689 | 6/1992 |
| 6,038,551 A | 3/2000 | Barlow | | EP | 0 085 546 A2 | 8/1983 |
| 6,048,267 A | 4/2000 | Winchinsky | | EP | 0085546 A2 | 8/1983 |
| 6,049,777 A | 4/2000 | Sheena | | EP | 00109189 A1 | 5/1984 |
| 6,050,568 A | 4/2000 | Hachquet | | EP | 0323383 | 7/1989 |
| 6,052,667 A | 4/2000 | Walker | | EP | 0 512 509 A2 | 11/1992 |
| 6,055,513 A | 4/2000 | Katz | | | | |

| | | |
|---|---|---|
| EP | 512413 | 11/1992 |
| EP | 512413 A | 11/1992 |
| EP | 0512509 A2 | 11/1992 |
| EP | 0526118 | 2/1993 |
| EP | 0619662 A | 10/1994 |
| EP | 0697793 A | 2/1996 |
| EP | 0 779 587 A2 | 9/1996 |
| EP | 0 779 587 A3 | 9/1996 |
| EP | 0779587 A2 | 9/1996 |
| EP | 0779587 A3 | 9/1996 |
| EP | 0744856 A | 11/1996 |
| EP | 0 817 138 A1 | 1/1998 |
| EP | 0817138 A1 | 1/1998 |
| EP | 0856812 A2 | 5/1998 |
| EP | 0 856 812 A2 | 8/1998 |
| EP | 0 862 150 A2 | 9/1998 |
| EP | 0862150 A2 | 9/1998 |
| GB | 1391060 | 4/1975 |
| GB | 2 109 305 A | 6/1983 |
| GB | 2109305 A | 6/1983 |
| GB | 2 265 032 A | 9/1993 |
| GB | 2265032 A | 9/1993 |
| GB | 2 317 257 A | 3/1998 |
| GB | 2317257 A | 3/1998 |
| JP | 57086974 | 5/1982 |
| JP | 58132886 A | 8/1983 |
| JP | 600251498 | 12/1985 |
| JP | 2001093 A | 1/1990 |
| JP | 2171891 | 7/1990 |
| JP | 2197998 | 8/1990 |
| JP | 2208798 A | 8/1990 |
| JP | 2 1990-289000 | 11/1990 |
| JP | 2278399 | 11/1990 |
| JP | 04060900 | 2/1992 |
| JP | 4095198 | 3/1992 |
| JP | 4235700 A | 8/1992 |
| JP | 4260914 | 9/1992 |
| JP | 04314189 | 11/1992 |
| JP | 5242363 A | 9/1993 |
| JP | 6035946 | 2/1994 |
| JP | 7065218 A | 3/1995 |
| JP | 7078274 | 3/1995 |
| JP | 07098779 A | 4/1995 |
| JP | 95139380 | 6/1995 |
| JP | 95162556 | 6/1995 |
| JP | 07249176 | 9/1995 |
| JP | 7272012 | 10/1995 |
| JP | 8030848 A | 2/1996 |
| JP | 08137951 | 5/1996 |
| JP | 8-147545 | 6/1996 |
| JP | 8221484 | 8/1996 |
| JP | 8221645 A | 8/1996 |
| JP | 08329323 A | 12/1996 |
| JP | 8329323 A | 12/1996 |
| JP | 8329350 | 12/1996 |
| JP | 09016836 A | 1/1997 |
| JP | 9062908 A | 3/1997 |
| JP | 9097288 | 4/1997 |
| JP | 9190478 A | 7/1997 |
| JP | 9190479 | 7/1997 |
| JP | H9 198554 | 7/1997 |
| JP | H9-198554 | 7/1997 |
| JP | 10031792 | 2/1998 |
| JP | 10187820 | 7/1998 |
| JP | 10214284 | 8/1998 |
| JP | 10240830 | 9/1998 |
| JP | 10269049 | 10/1998 |
| JP | 10289372 | 10/1998 |
| JP | 10289372 A | 10/1998 |
| JP | 11088560 | 3/1999 |
| JP | 11-505343 | 5/1999 |
| JP | 2003150769 | 5/2003 |
| KR | 9503826 B | 4/1995 |
| WO | WO 9016033 A | 12/1990 |
| WO | WO 94/09440 | 4/1994 |
| WO | WO 95/27242 | 10/1995 |
| WO | WO 95-27242 | 10/1995 |
| WO | WO 96/32701 | 10/1996 |
| WO | WO 96/34358 | 10/1996 |
| WO | WO 96/36926 A | 11/1996 |
| WO | WO 97/08638 | 3/1997 |
| WO | WO 97/08638 A1 | 3/1997 |
| WO | WO 97/16797 | 5/1997 |
| WO | WO 97/16897 | 5/1997 |
| WO | WO 97/20279 | 6/1997 |
| WO | WO 97/21200 | 6/1997 |
| WO | WO 97/23838 | 7/1997 |
| WO | WO 97/24701 | 7/1997 |
| WO | WO 97/25684 | 7/1997 |
| WO | WO 97/28510 | 8/1997 |
| WO | WO 97/35441 | 9/1997 |
| WO | WO 97/44749 | 11/1997 |
| WO | WO 97/46961 | 12/1997 |
| WO | WO 97/50064 | 12/1997 |
| WO | WO 98/06050 | 2/1998 |
| WO | WO 98/15907 | 4/1998 |
| WO | WO 98/19260 | 5/1998 |
| WO | WO 98/21713 | 5/1998 |
| WO | WO 98/28699 | 7/1998 |
| WO | WO 98/43149 | 10/1998 |
| WO | WO 98/48388 | 10/1998 |
| WO | WO 98/48563 | 10/1998 |
| WO | WO 98/49658 | 11/1998 |
| WO | WO 99/04326 | 1/1999 |
| WO | WO 99/07121 | 2/1999 |
| WO | WO 99/09508 | 2/1999 |
| WO | WO 99/11006 | 3/1999 |
| WO | WO 99/12117 A1 | 3/1999 |
| WO | WO 99/19809 | 4/1999 |
| WO | WO 99/38125 A1 | 7/1999 |

OTHER PUBLICATIONS

Office Action for U.S. Appl. No. 09/345,092 dated Mar. 15, 2001, 33pp.
Office Action for U.S. Appl. No. 09/345,092 dated Oct. 22, 2002, 42pp.
Office Action for U.S. Appl. No. 09/345,092 dated Jul. 1, 2005, 17pp.
Office Action for U.S. Appl. No. 09/345,092 dated Mar. 10, 2006, 8pp.
Office Action for U.S. Appl. No. 09/345,092 dated Aug. 29, 2006, 12pp.
Notice of Allowability for U.S. Appl. No. 09/345,092 dated Sep. 29, 2006, 4pp.
Notice of Allowability for U.S. Appl. No. 09/345,092 dated Mar. 1, 2007, 4pp.
Office Action for U.S. Appl. No. 09/345,092 dated Jun. 15, 2007, 2pp.
Office Action for U.S. Appl. No. 09/218,085 dated Nov. 3, 2000, 22pp.
Office Action for U.S. Appl. No. 09/218,085 dated May 23, 2007, 9pp.
Office Action for U.S. Appl. No. 09/218,085 dated Aug. 31, 2007, 2pp.
Office Action for U.S. Appl. No. 09/218,085 dated Nov. 24, 2006, 6pp.
Office Action for U.S. Appl. No. 09/218,085 dated Aug. 18, 2006, 4pp.
Office Action for U.S. Appl. No. 09/218,085 dated Mar. 9, 2006, 6pp.
Office Action for U.S. Appl. No. 09/218,085 dated Nov. 1, 2002, 24pp.
Office Action for U.S. Appl. No. 09/218,085 dated Oct. 19, 2004, 23pp.
Office Action for U.S. Appl. No. 09/218,085 dated Aug. 10 2005, 5pp.
Office Action for U.S. Appl. No. 09/218,085 dated Jul. 8, 2001, 23 pp.

Office Action for U.S. Appl. No. 10/095,372 dated Aug. 26, 2005, 12pp.
Office Action for U.S. Appl. No. 10/095,372 dated Mar. 4, 2005, 8pp.
Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals, 2pp.
Allan Z. Gilbert, "Financial Management: A call to action for wireless data communication", Automatic Merchandiser, Aug. 1996, pp. 62-64, 3pp.
"Coupon acceptor; Coinco", Beverage Industry, Jul. 1998, No. 7, vol. 89, p. 38, 2pp.
"Coinco offers BA-30 dollar bill acceptor", Automatic Merchandiser, Aug. 1998, p. 33, 2pp.
Rich Karlgaard, "Keep your eyes on the prize", Forbes, Sep. 21, 1998, p. 43, 3pp.
"Coupon acceptor", Beverage Industry, Dec. 1998, No. 12, vol. 89, p. 34, 1pp.
Tim Davis, "Vending suppliers scurry to meet Coke-mandated vendor communication", Automatic Merchandiser, Aug. 1996, pp. 62-64, 2pp.
Kohda, Youji, Endo, Susumu, "Ubiquitous Advertising on the WWW: Merging Advertisement on the Browser", Computer Networks and SDN Systems 28, May 1, 1996 at pp. 1493-1499, 7pp.
Henry, Anne, "High-tech vending: vending machine OEMs begin to resemble their consumer electronics counter parts when it comes to rapid-fire implementation of technology; original equipment manufacturers", Appliance, Dec. 1991, Section: vol. 48, No. 12, p. 39, ISSN: 0003-6781, 5pp.
Website: VendingMi$er, (http // www optimumenergy com/products/miser html), download date: Aug. 12, 1998, 2pp.
Brochure, "Introducing the Digital MenuBoard", Siren Technologies, Inc., (www sirentech com), 4pp.
Samuelson, Paul A., "Economics 8th Edition", McGraw-Hill Book Company, Copyright 1948, 1951, 4pp.
"Cape Town", Reuters Ltd, Nov. 8, 1979, PM Cycle, 1pp.
Cook, Louise, "ConsumerWatch: Clip, Snip, Save", The Associated Press, Mar. 12, 1984, Business News Section, 2pp.
Greene, Jan, "Farm bills please assns; National Grocers Association", Supermarket News, vol. 35, Dec. 23, 1985 at p. 6, 1pp.
"POS spectrum: a lottery looks to POS for growth", UMI, Inc., POS News, Jan. 1989, vol. 5, No. 7, p. 8, ISSN: 0896-6230, Coden: Bhorad, 1pp.
Kuttner, Robert, "Computers May Turn The World Into One Big Commodities Pit", Business Week, Sep. 11, 1989, Section: Economic Viewpoint, No. 3123 at p. 17, 2pp.
Schrage, Michael, "An Experiment In Economic Theory; Labs Testing Real Markets", The Record, Nov. 26, 1989, Section: Business at p. B01, 3pp.
"Let's Play the Cash Register Receipts Lottery", The New York Times, Dec. 25, 1990, Section 1, p. 30, col. 4, Editorial Desk, 1pp.
Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082, 3pp.
"Philips offers customers financing through Citicorp; Philips Medical Systems North America, Citicorp North America Inc." Health Industry Today, Jun. 1991, Section: vol. 54, No. 6, p. 4, ISSN: 0745-4678, 1pp.
Pelline, Jeff, "Travelers Bidding on Airline Tickets SF firm offers chance for cut-rate fares" The San Francisco Chronicle, Aug. 19, 1991, Sections: News at p. A4, 3pp.
Del Rosso, Laura, "Ticket-bidding firm closes its doors; Marketel International; Brief Article", Travel Weekly, Mar. 12, 1992, Section: vol. 51, No. 21, p. 1, ISSN: 0041-2082, 2pp.
Fink, Ronald, "Data processing: Pepsico.", Financial World, Sep. 29, 1992, vol. 161, No. 19, p. 52(1), ISSN: 0015-2064, 2pp.
Gilbert, Allan Z., "Operators can gain with creative merchandising", Automatic Merchandiser, Oct. 1992, p. 80, ISSN: 1061-1797, 3pp.
"Winn-Dixie/The Salvation Army Report Contributions for War Against Hunger", PR Newswire, Jun. 10, 1993, Section: Financial News, 1pp.

Gelernter, David, "The Cyber-Road Not Taken; Lost on the Info-Highway? Here's Some Stuff that Could Really Change Your Life", The Washington Post, Apr. 3, 1994, Section: Outlook, p. C1, 5pp.
Jones, Jeanne, "Data Readers Streamline Management; Scanner Technology Aids Retailers As Well As Plants, Wholesalers", The Houston Post, Jun. 26, 1994, Section: Business at p. D1, 2pp.
Smith, Alison, "Survey of UK Consumer Credit and Asset Finance", Financial Times, Nov. 3, 1994, Section: p. VI, 3pp.
Website: "FAQ: CSH Coke Machine Information", Institute of Information & Computing Sciences, (http //www cs uu nl/wais/html/na-dir/csh-coke-machine-info html), Feb. 4, 1995, 6pp.
Andreoli, Tom et al., "Cash Machines Offer A Whole Lotto Money For Withdrawl; An Unfortunate Juxtaposition; Block That Metaphor!; Something Street Talk; Fishy In Springfiled; State Street Sears?; Champion As Underdog; A 'Whole Language' Graduate", Crain's Chicago Business, Jun. 19, 1995, Section: News at p. 8, 2pp.
"Spain: BBV launches new card", Cards International, Jun. 22, 1995 at p. 5, 2pp.
Knippenberg, Jim, "Will local radio empires strike back?", The Cincinnati Enquirer, Jul. 23, 1995, Section: Tempo at p. F01, 1pp.
Brochure, "Cyber Bid", Net Fun Ltd., Copyright 1996, 9pp.
Hadley, Kimberly, "Pastors praying anti-arson effort will burn bias", The Nashville Banner, Jul. 26, 1996, Section: News at p. A13, 1pp.
Choate, Robert, "Why technology brings a great future for vending", Automatic Merchandiser, Oct. 1, 1997, Section: No. 10, vol. 39, p. 16, 1061-1797, 2pp.
"Letters to BusinessExtra", The San Francisco Chronicle, Dec. 26, 1989, Section: Business, C7, 3pp.
Wallace, David, "Company Planning to Let Flyers bid on Airfares", Philadelphia Business Journal, Mar. 26, 1990, Section: vol. 9, No. 3, Section 1, p. 15, 3pp.
Greenberg, Peter S., "The Savvy Traveler: Lower Air Fares for Consumers Not in the Cards . . . " Los Angeles Times, Jul. 8, 1990, Section: Travel, Part L, p. 2, col. 1, Travel Peak, 2pp.
Carey, Christopher, "Firm Offers Auction for Airline Tickets", St. Louis Post-Dispatch, Aug. 7, 1991, Section: Business, p. 1B, 2pp.
Upton, Kim, "News and Briefs: French Say Monoliths Off-Limits to Visitors", Los Angeles Times, Aug. 25, 1991, Section: Travel, Part L, p. 4, col. 1, Travel Desk, 2pp.
"Buy Low, Fly High", USA Today, Nov. 14, 1991, Section: Bonus, p. 15, 2pp.
Feldman, Joan M., "To rein in those CRSs; computer reservation systems" Air Transport World, Dec. 1991, Section: vol. 28, No. 12, p. 89, ISSN: 0002-2543, 5pp.
"Traveler's Notes; Bookit Report", Consumers Reports Travel Letter, Dec. 1991, Section: vol. 7, No. 12, p. 143, 1pg.
"CRTL's Blue Ribbon Deals for 1992", Consumer Reports Travel Letter, Jan. 1992, Section: vol. 8, No. 1, pp. 3-5, 2pp.
"Newsletters", The Atlanta Journal and Constitution, Mar. 1, 1992, Section: Travel: Section K, p. 13, 1pg.
Del Rosso, Laura, "Ticket-bidding firm closes its doors, Marketel International", Travel Weekly, Mar. 12, 1992, Section: vol. 51, No. 21, p. 1, ISSN: 0041-2082, 2pp.
Hainer, Cathy et al., "Where vacationing kids get good care", USA Today, Apr. 1, 1992, Section: Life, p. 4D, 2pp.
Weatherford, Lawrence R. And Bodily, Samuel E., "A Taxonomy and Research Overview of Perishable-Asset Revenue Management: Yield Management, Overbooking, and Pricing", Operations Research, Sep.-Oct. 1992, vol. 40, No. 5, pp. 831-844, 14pp.
Spencer, Milton H. And Amos, Jr., Orley M., "Contemporary Economics, Eight Edition", Worth Publishers, Copyright 1993, 5pp.
Rajendran, K.N. And Tellis, Gerard J., "Contextual and Temporal Components of Reference Price", Journal of Marketing, Jan. 1994, pp. 22-34 (13pp.).
Feldman, Joan M., "Reclaiming control; new software to close gap between projected and actual revenues", Aug. 1995, Section: vol. 32, No. 8, p. 35, ISSN: 0002-2543, 5pp.
*United Sates v. Eastman Kodak Co.*, United States Court of Appeals for the Second Circuit, Docket No. 97-6190, decided Aug. 4, 1995, 16pp.
Bronnenberg, Bart J., "Limited Choice Sets, Local Price Response, and Implied Measures of Price Competition", Journal of Marketing Research, Spring 1996, Section: vol. XXXIII, p. 163, 20pp.

Prentice, Michael, "Searching for the lowest fare: Getting the lowest fare takes work, but it's worth the effort", The Ottawa Citizen, Oct. 9, 1996, Section: Citylife; Consuming Passion, p. C3, 3pp.

"Auctioning unsold airline tickets", Insight (USA), download date: Oct. 29, 1996, 1pg.

"Web Ventures presents Bookit!", (http www webventures com/bookit), Copyright 1996, 1pg.

"Salomon Brother's Maldutis Says Internet is Aviation's 'Third Revolution;' Will Earn Billions", World Airline News, Mar. 21, 1997, Section: vol. 7, No. 12, 2pp.

Feldman, Joan M., "Pricing and cybersales; Internet airline ticket sales and reservations", Feb. 1998, Section: No. 2, vol. 35, p. 64, ISSN: 0002-2543, 4pp.

Adyanthaya, Surain, "Revenue Management: the Black Art." Interavia Business & Technology, Sep. 1998, Section: No. 623, vol. 53, p. 43, ISSN: 0983-1592, 4pp.

"Airfare Bargains on the Net: About E-mail Lists", (http //travel epicurious com/travel/c_planning/02_airfares/email/intro html), Copyright 1998, 17pp.

"Airtech—FlightPass Faq", (http //www airtech com/at_flightpass/at_faqflightpass htm), download date: Oct. 5, 1998, 4pp.

Varian, Hal R., "First Monday: Differential Pricing and Efficiency", (http www firstmonday dk/issues/issue2/different/), Copyright 1996, 18pp.

Kephart, Jeff, "Price Dynamics of Vertically; Introduction", (http //www research ibm com/infoecon...), Aug. 15, 1998, 3pp.

"Bookit Airfare Bidding System (Fax for Your Plane Ticket?)", Consumer Reports Travel Letter, Sep. 1991, Section: vol. 7, No. 9, pp. 97, 106, 3pp.

Nelson, Janet, "Practical Traveler; Airlines Relaxing Policy On No-Refund Tickets", The New York Times, Sep. 22, 1991, Section 5, p. 3, col. 1, Travel Desk, 4pp.

"Traveler's Notes; Easier Airfare Bidding.", Consumer Reports Travel Letter, Oct. 1991, Section: vol. 7, No. 10, p. 119, 1pg.

Website: VendMaster, "Windows for Vending PRO with Inventory", (http //www vendmaster com/pro_inv_main html), download date: Jul. 16, 1998, 2pp.

Website: Optimum Energy Group—Products, "VendingMi$er", (http //www optimumenergy com/products/miser html), download date: Aug. 12, 1998, 2pp.

Burke, Raymond R., "Virtual Shopping: Breakthrough in Marketing Research", Harvard Business Review, Mar.-Apr. 1996, pp. 120-131, 9pp.

PCT International Search Report for Application No. PCT/NO95/00060, dated Oct. 10, 1995, 3pp.

Rehayem, Gilbert, "Opinion: X-Press Betting", La Fleur's Lottery World, Feb 7, 1997, 1pg.

"Save the mark", Financial Times (London), Feb. 1, 1983, Section I, Men & Matters at p. 12, 1pg.

Office Action for U.S. Appl. No. 09/348,566, mailed Oct. 1, 2003, pp. 3-5, 3pp.

Anthony Joseph, "Baby the engine, and other saving tips", The Christian Science Monitor, Nov. 4, 1986, p. B10, 3p.

"Coupons & more", welcome to coolsavings.com—Copyright 1996-1999.(http://208,134.230.42/cgi-win/tempprs.exe/first.htm), 3pp.

"A personal shopping organizer for the web savvy consumer. My KillerApp offers a personalized shopping experience to meet the unique needs of every individual user". (http://www.killerapp.com/html/main/pr0004.html), Oct. 2, 1998, 2pp.

"New Wave Marketing", Promotion Times, An SCA Quarterly Newsletter—First Quarter, undated, 2pp.

Brochure: "Reaching in New Directions", First Data Corp., Merchant Services, undated, 31pp.

"Global, Second-Generation, and Frequent-Buyer Set New Trends", Marketing News, Jun. 7, 1985, vol. 19, No. 12, p. 18, ISSN: 0025-3790, 1pg.

Lacher, Lisa, "Coupon Gimmick Registers Profits", Business Dateline, Business Record, Dec. 7, 1987, vol. 83, No. 47, Section 1, 2pp.

Stevens, Lawrence, "Hypermarket Challenge", Computerworld, Dec. 19, 1988, Section: Software & Services, 2pp.

McIntyre, Faye, "Small businesses may prefer alternatives to advertising.", South Dakota Business Review, Jun. 1989, vol. 47, No. 4, p. 1(4), ISSN: 0038-3260, 4pp.

"Safeway Introduces Store-Generated Coupons", PR Newswire, May 1, 1990, 1pg.

Ramirez, Anthony, "The Pizza Version of Dialing '911'", The New York Times, Sep. 9, 1991, Late Edition—Final, Section D, p. 1, col. 3, Financial Desk, 4pp.

Blattenberg, Robert C., "Interactive marketing: exploiting the age of addressability.", Sloan Management Review, Sep. 22, 1991, Section: vol. 33, No. 1, p. 5, ISSN: 0019-848X, 15pp.

O'Kane, Gerry, "Parking your car by computer", South China Morning Post, Mar. 23, 1993, Section: Supplement at p. 3, 3pp.

McDowell, Bill, "Frequency marketing builds repeat business; Management", Information Access Company, a Thomson Corporation Company, Reed Publishing USA, Building Supply Home Centers, Aug. 1993, No. 2, vol. 165, p. 96, ISSN: 0890-9008, 5pp.

Arend, Mark, "Debit frenzy? Not quite, but getting there", ABA Banking Journal, Apr. 1994, vol. 86, No. 4, pp. 57-61, ISSN: 0194-5947, 4pp.

Rubel, Chad, "Young firm armed with technology fights an old giant; ETM to Ticketmaster: Let's rock", American Marketing Association, Marketing News TM, Jun. 19, 1995, 3pp.

"Tecmark Reward Terminal", Tecmark Services, Inc., Copyright 1996, (http //www tecmarkinc com/terminal htm), 1pg.

McKinney, Jeff, "Merchant program could pay off for Provident", The Cincinnati Enquirer, Mar. 24, 1996, Section: Financial at p. E02, 2pp.

"Staples The Office Superstore to Participate in Visa 'Rewards for Your Home' Promotion; Savings will be offered to thousands of Visa Staples customers.", Business Wire, Mar. 25, 1996, p. 3251164, 2pp.

Retailers in small N.D. town join forces (Discount Points Corp launches Discount Points, a multi-retailer consumer discount program), Tire Business, Apr. 29, 1996, vol. 14, No. 2, p. 10, 3pp.

Wagner, Jim, "Cameras Tell Mall What Door You Use, How Often You Go", Albuquerque Tribune, Aug. 9, 1996, Section: Evening, 2pp.

Fickenscher, Lisa, "Amex to Start Free Rewards Program with Discounts on Merchandise", The American Banker, Oct. 18, 1996, Section: Credit/Debit/ATMS at p. 10, 2pp.

Fitzgerald, Kate, "Amex Program Moves Loyalty to Next Level: Custom Extras Finds A Medium Customers Can't Ignore: Billing Statements", Crain Communications Inc., Advertising Age, Nov. 4, 1996, Section: News, 2pp.

"Click this box for extra pepperoni; CyberSlice routes online orders", The Dallas Morning News, Dec. 2, 1996, Section: Business, 2pp.

"Frequent shopper programs are taking off", Grocery Marketing, Jan. 1997, vol. 63, No. 1, p. 54, 2pp.

Fickenscher, Lisa, "Merchant: American Express Seeks to Mine Its Data on Cardholder Spending Patterns", The American Banker, Mar. 24, 1997, Section: Credit/Debit/ATMS at p. 20, 2pp.

"Dispensing the future", Lafferty Publications Limited, Electronic Payments International, May 1997, Section: Feature at p. 12, 5pp.

"Grocery shopping goes on line in many markets; Technology spurs remote ordering concept", The Dallas Morning News, May 12, 1997, Section: Business at p. 2D, 2pp.

"Industry Briefs", Phillips Business Information, Inc., Card News, Jun. 9, 1997, vol. 12, No. 11, 2pp.

Popyk, Bob, "Turn customers into torchbearers", Information Access Company, a Thomson Corporation Company, National Trade Publications, Boating Industry, Sep. 1997, No. 9, vol. 60, p. 33, ISSN: 0006-5404, 3pp.

Hoeschen, Brad, "Brookfield Square hopes mall card strikes a chord", The Business Journal of Milwaukee Inc., Business Dateline, Business Journal-Milwaukee, Sep. 12, 1997, vol. 14, No. 50 at p. 19, 2pp.

"Acxiom Case-in-Point Case Study—Bloomingdale's Inc.", "Pushing Technology's Edge Upscale department store applies database for profit", (http //www acxiom com/cip-cs-b htm), download date: Sep. 23, 1997, 2pp.

"NCR 7452 Workstation—Beyond Traditional POS", (http //www ncr com/product/retail/products/catalog/7452 shtml), download date: Sep. 23, 1997, 3pp.

"From Our Family to Yours . . . 5 Weeks of Coupon Values for a Valuable Customer", Shoprite, Wakefern Food Corporation, Copyright 1998, 1pg.

Heller, Al, "Chain Pharmacy: Forecast '98: New Technology Advances Pharmacy Productivity", Lebhar-Friedman Inc., Drug Store News, Jan. 12, 1998 at p. CP29, 3pp.

"Advanced Mechanics Internet Specials", (http //www metroplexweb com/advcpn2 htm), download date: Mar. 12, 1998. 2pp.

Website: "New Partners, more exciting rewards: The Membership Rewards program for 1998.", (http //www americanexpress com/rewards/news/docs/1998new_mr shtml), download date: Mar. 12, 1998, 38pp.

Website: "U.P.C. Coupon Code Guidelines Manual", (http //www uc-council org/d31-3 htm), download date: Mar. 12, 1998, 10pp.

Rubinstein, Ed, "Internet Continues To Fortify Takeout Sector For Operators", Lebhar-Friedman Inc., Nation's Restaurant News, Mar. 23, 1998 at p. 55, 5pp.

Information Packet: "My Points®—Universal Rewards Currency", MotivationNet, Inc. Apr. 1998, 29pp.

Hemsley, Steve, "Research and destroy; Point-of-purchase research provides brand managers . . . ", Centaur Communications Ltd., Marketing Week, Apr. 16, 1998, Section: Point of Purchase at pp. 33-36, (3pp).

"WellsPark Group Lauches 'V.I.P. Rewards'; the Most Comprehensive Relationship Marketing Program Ever Created by a Mall Developer", Business Wire, Inc., May 19, 1998, 2pp.

"Catching Red Light Runners", Business Communications Company, Advanced Transportation Technology News, Jun. 1998, vol. 5, No. 2, 2pp.

Amato-McCoy, Deena, "Co-Branded Acme Credit Card Rewards Loyal Users", Information Access Company, A Thomson Corporation Company, Capital Cities Media Inc., Supermarket News, Jun. 15, 1998, p. 17, ISSN: 0039-5803, 2pp.

"Acme Markets, U.S. Bancorp Debut visa Rewards Card", Phillips Business Information, Inc., Card News, Jun. 22, 1998, vol. 13, No. 12, 1pg.

Rubinstein, Ed, "Technology: Prepaid program lets Galleria guests dine 'a la Card'", Nations's Restaurant News, (http //www nrn com), Jun. 29, 1998, 1pg.

"DataCard Partners With CSI To Offer Card-Based Loyalty Solution To Merchants", Business Wire, Inc., Jul. 9, 1998, 1pg.

Albright, Mark, "Grocery savings via Web coupons", Times Publishing Company, St. Petersburg Times, Jul. 22, 1998, Section: Business at p. 1E, 2pp.

Campos, Frellie, "Discount shopping program extended to residents.", Pacific Business News, Sep. 21, 1998, vol. 36, Issue 27, p. 32, 3/5p, ISSN: 0030-8552, 3pp.

"Garage management needs", "Unit Tracking with The General Manager Professional", (http www dacobusy com/garage/idxgarg htm), download date: Mar. 16, 1999, 2pp.

"Route Sales Automation—Track customers, orders, sales, and inventory! Route accounting, . . . ", "Point of sale system carried in the palm of your hand", (http //www dacobusy com/), download date: Mar. 16, 1999, 1pg.

"Alphatech, Inc., Looking to the Future", (http //www alphatech com/), download date: Mar. 25, 1999, 1pg.

"Alphatech: Technologies and Projects", (http //www alphatech com/secondary/techpro/compvis html), download date: Mar. 25, 1999, 1pg.

"IMPS: Vehicle License Plate Recognition System", "IMPS™ Integrated Multi-Pass System State of the Art Vehicle License Plate Recognition System", (http www singapore com/optasia/imps), download date: Mar. 25, 1999, 3pp.

"MSTAR main", "Moving and Stationary Target Acquisition and Recognition (MSTAR)", (http www alphatech com/secondary/techpro/projects/mstar/MSTAR_TopLevel html), download date: Mar. 25, 1999, 2pp.

"Welcome to Q Lube!", (http //www qlube com/), download date: Mar. 25, 1999, 1pg.

PCT Notification of Transmittal of the International Search Report or the Declaration for PCT/US99/22650, Dated Mar. 16, 2000, 10pp.

PCT Notification of Transmittal of the International Search Report or the Declaration for PCT/US99/21720, Dated Mar. 23, 2000, 7pp.

Website: "Pricing, The Professional Pricing Society Conference Agenda", (http //www pricing-advisor com/conf_agn htm), download date: Jun. 19, 1999, 10pp.

Press Release, "Priceline.com Delivers Savings for Flexible Travelers in Side-By-Side Price Compairson", Priceline.com, Stamford, CT, May 28, 1999, 4pp.

"Travel Industry Bellwether for All Commerce Players", Jupiter Communications, Copyright 1999, Jupiter Strategic Planning Services, 2pp.

"Circuit City to Integrate E-Commerce with store shopping; retailer's E-superstore—www.circuitcity.com—to Open in July", PR Newswire, Jun. 15, 1999; Section: Financial News, 3pp.

"Wal-Mart vs. Amazon: The fight begins"; Yahoo News, Jun. 9, 1999, 3pp.

"Mercata—Group Buying Power", (http://www.mercata.com/cgi-bin/mercata/mercata/v1/pages/home.jsp), download date: Jun. 7, 1999, 5pp.

David Lazarus, "E-Commerce, Japanese style", Wired online page, Jun. 7, 1999, 3pp.

"Kmart expands inventory via in-store kiosks", Jun. 20, 1999, RTNews; (www.retailtech.com), 1pg.

"WebVoucher", (www.pinex.co.uk/webvoucher/), download date: Mar. 14, 1999, 2pp.

Quinn, Jane Byrant, "New Cars for Less", Newsweek; Oct. 23, 1978; Section: The Columnists; p. 80, 2pp.

"My Auto Broker—Online Auto Broker", (http://www.adverlink.com/myautobroker/), download date: May 28, 1997, 4pp.

Hilts, Paul, "Technology meets commerce; electronic publishing; includes articles on the World Wide Web and the annual Military Book Show; ABA '96", Publisher's Weekly, vol. 243; No. 28; p. 43; ISSN: 0000-0019, 4pp.

"About CyberSlice", (http://www.cyberslice.com/cgi-bin/WebObjects/CyberSlice:2@httpserv01/), download date: May 6, 1997, 2pp.

"PriceWatch", (http://icon.co.za/-robo/prod01.htm), Jan. 14, 1997, 5pp.

PCT International Search Report for Application No. PCT/US97/13588, dated Dec. 4, 1997, 3 pp.

Davis, Tim "Vending suppliers scurry to meet Coke-Mandated vendor communication", Automatic Merchandiser, Dec. 1992, pp. 62-64, 2pp.

Conlon et al. "Press 1 for profit." Sales and Marketing Management. Sep. 1998, 6pp.

PCT International Search Report for Application No. PCT/US00/13349, dated Nov. 9, 2000, 3pp.

Burke, Raymond R. "Do You See What I See? The Future of Virtual Shopping." Journal of the Academy of Marketing Science, vol. 25, No. 4, pp. 352-360, Fall 1997, 17pp.

"SaveSmart—How SaveSmart Works for Consumers"; (http://savesmart.com/consumer/consumer-howitworks.html), Copyright 1998, 7pp.

"Welcome to Planet U, providers of U-pons—Internet Coupons—Internet Coupons"; (http://www.webcertificate.com:443/webcert/faq-detail.asp), Copyright 1998, 8pp.

Webcertificate, the perfect gift-giving solution . . . It's quick! It's Easy! It's Secure!; (http://www.webertificate.com:443/webcert/faq-detial.asp), Copyright 1998, 14pp.

Shop the Marketplace, 1-800-flowers.com; (http://www.1800flowers.com/flowers/welcome.asp), Copyright 1998, 4pp.

"The Leader in Internet Shopping Systems for Supermarkets and Drug Stores", groceries online. copyright 1996 Groceries Online, Inc. (http://www.groceries-online.com/), Copyright 1996, 4pp.

"Brother Industries is pushing ahead with its new PC software . . . ", IDC Japan Report, Aug. 30, 1991, Section: vol. 17, p. 53, 1pg.

Maras, Elliot, "1995: downsizing adds costs; new strategies sought", Automatic Merchandiser, Aug. 1996, pp. 20-22, 24, 26, 28, 30, 32, 34, 36, 38, 40 and 44 (13pp.).

Naik, Gautam, "In Digital Dorm, Click on Return for Soda", The Wall Street Journal, Jan. 23, 1997, Section: Online, p. B1, 3pp.

Shea, Barbara, "Read Fine Print When Comparing Car Rentals", Feb. 9, 1997, St. Louis Post-Dispatch, Section: Travel & Leisure, p. 04T, 2pp.

Website: "CSH Drink Machine(s)", (http //www csh rit edu/proj/drink html), download date: Jan. 29, 1998, 2pp.

Desjardins, Doug, "Hollywood's Investment in Online Video Retailer Gets Mixed Reviews", Video Store, Aug. 9, 1998, Section: p. 1, ISSN: 0195-1750, 3pp.

Website: "FAQ: CSH Coke Machine Information", (http //www cs uu nl/wais/html/na-dir/csh-cokemachine-info html), May 5, 1994, 6pp.

Stigler, George J., "The Theory of Price", The Macmillan Company, Copyright 1952, pp. 82-94, 214-221 (14pp.).

Bowman, Jr., Ward S., "Tying Arrangements and the Leverage Problem", The Yale Law Journal, Nov. 1957, vol. 67, No. 1, pp. 19-36 (10pp.).

Stigler, George J., "The Theory of Price", The Macmillan Company, Third Edition, Copyright 1966, pp. 82-94, 208-215 (8pp).

Narasimhan, Chakravarthi, "A Price Discrimination Theory of Coupons", Marketing Science, Spring 1984, vol. 3, No. 2, pp. 128-147 (20pp.).

Judith Evans, "Who was that masked Cybershopper?; MasterCard-Visa Agreement on Credit Card security may make ON-LINE commerce fly", The Washington Post, View Related Topics; Feb. 2, 1996, Final Edition; Section: Financial; p. F01, 2pp.

"First Virtual Holdings Releases Beta Software for Secure Transactions on Microsoft Merchant Server", PR Newswire, Mar. 31, 1997; Section: Financial News, 2pp.

"Six vendors sign on for early electronic commerce venture", Phillips Business Informaion, Inc. Voice Technology News, Dec. 13, 1994; No. 25, vol. 6; ISSN: 1045-1498, 2pp.

"The easy, pain-free way to buy or lease your next car", What is autoseek; (http://www.autoseek.com/#what) download date: May 28, 1997, 4pp.

Nora Lockwood Tooher, "Macy's new gift card gets trial run in Warwick", The Providence Journal-Bulletin; Oct. 1, 1998; Section: Business; p. 1E, 2pp.

Denise Caruso, "Digital Commerce; The boom in on-line shopping adds a twist to the old quandary of how to tax interstate purchases", The New York Times, View Related Topics, Dec. 28, 1998; Late Edition—Final; Section: C; p. 3; col. 5; Business/Financial Desk, 3pp.

Godwin, Nadine, "New software was key lure in $17 million agency buyout.", Travel Weekly, Nov. 26, 1984, Section: vol. 43, p. 45, ISSN: 0041-2082, 4pp.

"Woodside Management Systems Inc. today announced . . . ", PR Newswire, Apr. 1, 1986, 2pp.

Tellis, Gerard J., "Beyond the Many Faces of Price: An Integration of Pricing Strategies", Journal of Marketing, Oct. 1986, vol. 50, pp. 146-160, 15pp.

Del Rosso, Laura, "Firm proposes ticket-bidding system; Marketel explores electronic auction of travel; Marketel International", Travel Weekly, Nov. 13, 1989, Section: No. 91, vol. 48, p. 1, ISSN: 0041-2082, 3pp.

Woolley, Scott, "I got it cheaper than you", Forbes, Nov. 2, 1998, Section: Management, Strategies, Trends, p. 82, 4pp.

Website: VendMaster,"Products; Windows for Vending", (http //www vendmaster com/products_main html), download date: Jul. 16, 1998, 2pp.

Rehayem, Gilbert, "Opinion: X-Press Betting", La Fleur's Lottery World, Feb. 7, 1997, 1pg.

"Cape Town", Reuters Ltd, Nov. 8, 1979, PM Cycle, 1pg.

"Coupons get serious; supermarkets use barcodes to prevent misredemptions", Chain Store Age Executive with Shopping Center Age, Oct. 1992, Section: vol. 68, No. 10, p. 68, ISSN: 0193-1199, 2pp.

Fiorini, Phillip, "'No Place for Penny?'/Smallest coin doesn't make cents to some", USA Today, Jul. 29, 1994, Section: News at p. 1A, 3pp.

"Spain: BBV launches new card", Cards International, Jun. 22, 1995, 1pg.

Maras, Elliot, "Software opens doors to scientific machine menuing", Automatic Merchandiser, Feb. 1996, p. 36, ISSN: 0002-7545, 5pp.

Hadley, Kimberly, "Pastors praying anti-arson effort will bum bias", The Nashville Banner, Jul. 26, 1996, Section: News at p. A13, 1pg.

Gapper, John, "NatWest reports rise in bad debt", Financial Times, Jul. 31, 1996, Section: News: UK, 1pg.

"Lynx Technology: Lynx to provide business leasing programme through Schroder Leasing", M2 Presswire, Aug. 9, 1996, 2pp.

Brochure, "For the Crew & the Customer: The Best Drive-Thru & Grill Service", Olivetti North America, Winter 1998, 2pp.

"VendMaster: Windows and Vending Software, Reports", (http //www vendmaster com/reports_main html), download date: Feb. 6, 1998, 12pp.

Taylor, Paul, "Towards a dream market", Financial Times (London), Sep. 4, 1996, Section: Survey—FT IT, 2pp.

Singletary, Michelle, "Electronic World, Unchecked Problem? U.S. Move to Paperless Payments Raises Worries About Those Who Don't Use Banks", The Washington Post, Mar. 4, 1997, Section: Financial, 4pp.

Hirschfeld, David, "Increasing Profits Through Automation", Independent Vendors Association Quarterly, Apr./May/Jun. 1997, 10pp.

"Avco Financial Services", National Home Furnishing Association, (http //www homefurnish comNHFA/avco htm), download date: May 23, 1997, 2pp.

Website, "Catalina Marketing Corporation", (http //catalinamktg com/prodcdir htm), Copyright 1997, 17pp.

Riordan, Teresa, "Patents; A novel approach to making a better spermicide harks back to some old-fashioned methods", The New York Times, Jun. 9, 1997, Section D, p. 2, col. 1, Business/Financial Desk, 3pp.

Nairn, Geoff, "The key to your identity: Falling costs will allow fingerprint verification to be widely used, reports Geoff Nairn", Financial Times (London), Jul. 15, 1997, Section: Technology; at p. 12, 3pp.

"The United Computer Exchange, How It All Works", (http //www uce com/howitworks html), Copyright 1995-1997, 6pp.

"Classified 2000: the Internet Classifieds", Classifieds2000, Inc., (http //www classifieds2000 com/cgi-cls/Display exe?C2K+aboutus), Copyright 1996-1997, 3pp.

"General trading information and terms provided by tradingfloor. com", (http //www tradingfloor com/info htm), Oct. 22, 1996, 11pp.

"NASDAQ", Information Sheet, (http //home axford com/corfin/corf11 htm), download date: Aug. 15, 1997, 3pp.

"Public Internet Kiosks, Inc. Receives First Order for Its 'Internet Station'—The Vending Machine of the Future", PR Newswire, Sep. 16, 1996, 2pp.

French, Simone A. et al., "A Pricing Strategy to Promote Low-Fat Snack Choices through Vending Machines", American Journal of Public Health, May 1997, vol. 87, No. 5, 3pp.

PCT International Search Report for Application No. PCT/US98/21216, dated May 4, 1999, 4pp.

Office Action for U.S. Appl. No. 09/348,566, mailed Oct. 1, 2003, pp. 3-5.

Retailers in small N. D. town join forces (Discount Points Corp launches Discount Points, a multi-retailer consumer discount program), Tire Business, Apr. 29, 1996, vol. 14, No. 2, p. 10, 3pp.

Bonnici, Joseph et al., "Consumer issues in coupon usage: An exploratory analysis", Journal of Applied Business Research, Winter 1996/1997, vol. 13, No. 1, p. 31-40, ISSN: 0892-7626, CODEN: JPBEBK, 12pp.

"Frequent shopper programs are taking off.", Grocery Marketing, Jan. 1997, vol. 63, No. 1, p. 54, 2pp.

"Dispensing the future", Lafferty Publications Limited, Electronic Payments International, May 1997, Section: Feature at p. 12, 5pp.

"Grocery shopping goes on line in many markets; Technology spurs remote ordering concept", The Dallas Morning News, May 12, 1997, Section: Business at p. 2D, 2pp.

"Industry Briefs", Phillips Business Information, Inc., Card News, Jun. 9, 1997, vol. 12, No. 11, 2pp.

Popyk, Bob, "Turn customers into torchbearers", Information Access Company, A Thomson Corporation Company, National Trade Publications, Boating Industry, Sep. 1997, No. 9, vol. 60, p. 33, ISSN: 0006-5404, 3pp.

Hoeschen, Brad, "Brookfield Square hopes mall card strikes a chord", The Business Journal of Milwaukee Inc., Business Dateline, Business Journal-Milwaukee, Sep. 12, 1997, vol. 14, No. 50 at p. 19, 2pp.

"Acxiom Case-in-Point Case Study—Bloomingdale's Inc.", "Pushing Technology's Edge Upscale department store applies database for profit", (http //www acxiom com/cip-cs-b htm), download date: Sep. 23, 1997, 2pp.

"NCR 7452 Workstation—Beyond Traditional POS", (http //www ncr com/product/retail/products/catalog/7452 shtml), download date: Sep. 23, 1997, 3pp.

"From Our Family to Yours . . . 5 Weeks of Coupon Values for a Valuable Customer", Shoprite, Wakefern Food Corporation, Copyright 1998, 1pg.

Heller, Al, "Chain Pharmacy: Forecast '98: New Technology Advances Pharmacy Productivity", Lebhar-Friedman Inc., Drug Store News, Jan. 12, 1998 at p. CP29, 3pp.

Website: "New Partners, more exciting rewards: The Membership Rewards program for 1998.", (http //www americanexpress com/rewards/news/docs/1998new_mr shtml), download date: Mar. 12, 1998, 38pp.

Website: "U.P.C. Coupon Code Guidelines Manual", (http //www uc-council org/d31-3 htm), download date: Mar. 12, 1998, 10pp.

Rubinstein, Ed, "Internet Continues To Fortify Takeout Sector For Operators", Lebhar-Friedman Inc., Nation's Restaurant News, Mar. 23, 1998 at p. 55, 5pp.

Information Packet: "My Points®—Universal Rewards Currency", MotivationNet, Inc. Apr. 1998, 29pp.

Hemsley, Steve, "Research and destroy; Point-of-purchase research provides brand managers . . . ", Centaur Communications Ltd., Marketing Week, Apr. 16, 1998, Section: Point of Purchase at pp. 33-36, (3pp).

"WellsPark Group Lauches 'V.I.P. Rewards'; the Most Comprehensive Relationship Marketing Program Ever Created by a Mall Developer", Business Wire, Inc., May 19, 1998, 2pp.

"Catching Red Light Runners", Business Communications Company, Advanced Transportation Technology News, Jun. 1998, vol. 5, No. 2, 2pp.

Amato-McCoy, Deena, "Co-Branded Acme Credit Card Rewards Loyal Users", Information Access Company, A Thomson Corporation Company, Capital Cities Media Inc., Supermarket News, Jun. 15, 1998, p. 17, ISSN: 0039-5803, 2pp.

"Acme Markets, U.S. Bancorp Debut visa Rewards Card", Phillips Business Information, Inc., Card News, Jun. 22, 1998, vol. 13, No. 12, 1pg.

Rubinstein, Ed, "Technology: Prepaid program lets Galleria guests dine 'a la Card'", Nations's Restaurant News, (http //www nrn com), Jun. 29, 1998, 1pg.

"DataCard Partners With CSI To Offer Card-Based Loyalty Solution To Merchants", Business Wire, Inc., Jul. 9, 1998, 1pg.

Albright, Mark, "Grocery savings via Web coupons", Times Publishing Company, St. Petersburg Times, Jul. 22, 1998, Section: Business at p. 1E, 2pp.

Campos, Frellie, "Discount shopping program extended to residents.", Pacific Business News, Sep. 21, 1998, vol. 36, Issue 27, p. 32, 3/5p, ISSN: 0030-8552, 3pp.

"Garage management needs", "Unit Tracking with The General Manager Professional", (http www dacobusy com/garage/idxgarg htm), download date: Mar. 16, 1999, 2pp.

"Route Sales Automation—Track customers, orders, sales, and inventory! Route accounting, . . . ", "Point of sale system carried in the palm of your hand", (http //www dacobusy com/), download date: Mar. 16, 1999, 1pg.

"Alphatech, Inc., Looking To The Future", (http //www alphatech com/), download date: Mar. 25, 1999, 1pg.

"Alphatech: Technologies and Projects", (http //www alphatech com/secondary/techpro/compvis html), download date: Mar. 25, 1999, 1pg.

"IMPS: Vehicle License Plate Recognition System", "IMPS™ Integrated Multi-Pass System State of the Art Vehicle License Plate Recognition System", (http www singapore com/optasia/imps), download date: Mar. 25, 1999, 3pp.

"MSTAR main", "Moving and Stationary Target Acquisition and Recognition (MSTAR)", (http www alphatech com/secondary/techpro/projects/mstar/MSTAR_TopLevel html), download date: Mar. 25, 1999,2pp.

"Welcome to Q Lube!", (http //www qlube com/), download date: Mar. 25, 1999, 1pg.

PCT Notification of Transmittal of the International Search Report or the Declaration for PCT/US99/22650, Dated Mar. 16, 2000, 10pp.

PCT Notification of Transmittal of the International Search Report or the Declaration for PCT/US99/21720, Dated Mar. 23, 2000, 7pp.

Website: "Pricing, The Professional Pricing Society Conference Agenda", (http //www pricing-advisor com/conf_agn htm), download date: Jun. 19, 1999, 10pp.

Press Release, "Priceline.com Delivers Savings For Flexible Travelers In Side-By-Side Price Compairson", Priceline.com, Stamford, CT, May 28, 1999, 4pp.

"Travel Industry Bellwether for All Commerce Players", Jupiter Communications, Copyright 1999, Jupiter Strategic Planning Services, 2pp.

"Circuit City to Integrate E-Commerce with store shopping; retailer's E-superstore—www.circuitcity.com—to Open in July", PR Newswire, Jun. 15, 1999; Section: Financial News, 3pp.

"Wal-Mart vs. Amazon: The fight begins";Yahoo News, Jun. 9, 1999, 3pp.

"Mercata—Group Buying Power", (http://www.mercata.com/cgi-bin/mercata/mercata/v1/pages/home.jsp), download date: Jun. 7, 1999, 5pp.

David Lazarus, "E-Commerce, Japanese style", Wired online page, Jun. 7, 1999, 3pp.

"Kmart expands inventory via in-store kiosks", Jun. 20, 1999, RTNews; (www.retailtech.com), 1pg.

"WebVoucher", (www.pinex.co.uk/webvoucher/), download date: Mar. 14, 1999, 2pp.

Quinn, Jane Byrant, "New Cars for Less", Newsweek; Oct. 23, 1978; Section: The Columnists; p. 80, 2pp.

"My Auto Broker—Online Auto Broker", (http://www.adverlink.com/myautobroker/), download date: May 28, 1997, 4pp.

Hilts, Paul, "Technology meets commerce; electronic publishing; includes articles on the World Wide Web and the annual Military Book Show; ABA '96", Publisher's Weekly, vol. 243; No. 28; p. 43; ISSN: 0000-0019, 4pp.

"About CyberSlice", (http://www.cyberslice.com/cgi-bin/WebObjects/CyberSlice:2@httpserv01/), download date: May 6, 1997, 2pp.

"PriceWatch", (http://icon.co.za/-robo/prod01.htm), Jan. 14, 1997, 5pp.

PCT International Search Report for Application No. PCT/US97/13588, dated Dec. 4, 1997, 2pp.

Samuelson, Paul, Economics, McGraw-Hill Book Company, $8^{th}$ Edition, Copyright 1948, pp. 446, 532.

Hennry, Anne, "High-tech vending: vending machine OEMs begin to resemble their consumer electronics counter parts when it comes to rapid-fire implementation of technology; original equipment manufacturers", Appliance, Dec. 1991, Section: vol. 48, No. 12, p. 3, ISSN: 0003-6781.

Fink, Ronald, "Data processing: PepsiCo.", Finance World, Sep. 29, 1992, vol. 161, No. 19, p. 52(1), ISSN: 0015-2064.

Website: "VendingMi$er", (http://www.optimumenergy.com/products/miser.html), download date Aug. 12, 1998.

Davis, Tim "Vending suppliers scurry to meet Coke-Mandated vendor communication", Automatic Merchandiser, Dec. 1992, pp. 62-64, 2pp.

Conlon et al. "Press 1 for profit." Sales and Marketing Management. Sep. 1998,6pp.

PCT International Search Report for Application No. PCT/US98/21216, dated May 4, 1999, 4pp.

PCT International Search Report for Application No. PCT/US00/13349, dated Nov. 9, 2000.

U.S . Examiner's Office Action dated Mar. 20, 2001, U.S. Appl. No. 09/345,092, filed Jun. 30, 1991 to Walker et al., 33 pages.

U.S . Examiner's Office Action dated Oct. 22, 2002, U.S. Appl. No. 09/345,092, filed Jun. 30, 1999 to Walker et al., 38 pages.

U.S . Examiner's Office Action dated Jul. 1, 2005, U.S. Appl. No. 09/345,092, filed Jun. 30, 1999 to Walker et al., 17 pages.

U.S . Examiner's Office Action dated Mar. 10, 2006, U.S. Appl. No. 09/345,092, filed Jun. 30, 1999 to Walker et al., 8 pages.

U.S. Examiner's Office Action dated Aug. 29, 2006, U.S. Appl. No. 09/345,092, Filing Date Jun. 30, 1999 to Walker et al., 12 pages.
U.S. Examiner's Notice of Allowance and Fees Due dated Oct. 24, 2006, U.S. Appl. No. 09/345,092, filed Jun. 30, 1999 to Walker et al., 3 pgs.
U.S. Examiner's Notice of Allowance and Fees Due dated Mar. 9, 2007, U.S. Appl. No. 09/345,092, filed Jun. 30, 1999 to Walker et al., 6 pgs.
Burke, Raymond R. "Do You See What I See? The Future of Virtual Shopping." Journal of the Academy of Marketing Science, vol. 25, No. 4, pp. 352-360, Fall 1997, 17pp.
U.S. Appl. No. 08/946,508, filed Oct. 7, 1997, Walker.
U.S. Appl. No. 09/045,036, filed Mar. 20, 1998, Walker.
U.S. Appl. No. 09/045,084, filed Mar. 20, 1998, Van Luchene.
U.S. Appl. No. 09/045,347, filed Mar. 20, 1998, Alderucci.
U.S. Appl. No. 09/045,386, filed Mar. 21, 1998, Walker.
U.S. Appl. No. 09/045,518, filed Mar. 20, 1998, Van Luchene.
U.S. Appl. No. 09/076,409, filed May 12, 1998, Walker.
U.S. Appl. No. 09/083,689, filed May 21, 1998, Van Luchene.
U.S. Appl. No. 09/083,483, filed May 22, 1998, Walker.
U.S. Appl. No. 09/085,424, filed May 27, 1998, Walker.
U.S. Appl. No. 09/107,971, filed Jun. 30, 1998, Van Luchene.
Office Action dated Sep. 20, 2007, U.S. Appl. No. 08/947,798, 7 pp.
Office Action dated Jun. 6, 2007, U.S. Appl. No. 08/947,798, 14 pp.
Office Action dated Dec.18, 2006, U.S. Appl. No. 08/947,798, 21 pp.
Office Action dated Mar. 9, 2006, U.S. Appl. No. 08/947,798, 15pp.
Office Action dated Jan. 12, 2005, U.S. Appl. No. 08/947,798, 15 pp.
Office Action dated May 20, 2004, U.S. Appl. No. 08/947,798, 16 pages.
Office Action dated Feb. 25, 2003, U.S. Appl. No. 08/947,798, 12 pages.
Office Action dated Jul. 5, 2002, U.S. Appl. No. 08/947,798, 19 pages.
Office Action dated May 8, 2001, U.S. Appl. No. 08/947,798, 23 pages.
Office Action dated Oct. 26, 2000, U.S. Appl. No. 08/947,798, 5 pages.
Office Action dated Jan. 20, 2000 for U.S. Appl. No. 08/947798, 17pp.
International Preliminary Examination Report for Application No. PCT/US98/21216 dated Sep. 24, 1999, 4pp.
Written Opinion for Application No. PCT/US98/05787 dated Jul. 29, 1999, 10pp.
International Search Report for Application No. PCT/US98/05787 dated May 12, 1999, 2pp.
Myhre, James W., "Examiner's Affidavit", dated Feb. 22, 2001, 1pp.
Office Action for U.S. Appl. No. 11/425,228 mailed Jul. 25, 2007, 6 pp.
Office Action for U.S. Appl. No. 11/456,276 mailed Dec. 31, 2007, 10 pp.
Notice of Allowance for U.S. Appl. No. 10/457,101 mailed Nov. 7, 2007, 6 pp.
Office Action for U.S. Appl. No. 10/457,101 mailed May 25, 2007, 13 pp.
Office Action for U.S. Appl. No. 10/457,101 mailed Oct. 20, 2006, 12 pp.
Supplemental Notice of Allowability for U.S. Appl. No. 10/457,101 mailed Dec. 11, 2007, 4 pp.
Office Action for U.S. Appl. No. 10/625,089 mailed Sep. 10, 2007, 11 pp.
Office Action for U.S. Appl. No. 10/625,089 mailed Apr. 5, 2006, 7 pp.
Office Action for U.S. Appl. No. 10/625,089 mailed Oct. 24, 2005, 7 pp.
Office Action for U.S. Appl. No. 09/107,971 mailed Feb. 2, 2004, 28 pp.
Office Action for U.S. Appl. No. 09/107,971 mailed Oct. 21, 2003, 26 pp.
Office Acton for U.S. Appl. No. 09/107,971 dated Jul. 10, 2002, 30pp.
Office Action for U.S. Appl. No. 09/107,971 mailed Oct. 3, 2001, 24 pp.
Office Action for U.S. Appl. No. 09/045,036, mailed Dec. 11, 2007, 9pp.
International Preliminary Report for Application No. 98/05787 dated Sep. 22, 1999, 9pp.
Office Action for U.S. Appl. No. 11/456,342 dated Sep. 14, 2007, 6pp.
Notice of Allowance for U.S. Appl. No. 11/456,342 dated Feb. 14, 2008, 3pp.
Office Action for U.S. Appl. No. 08/947,798 dated Jan. 11, 2008, 6pp.
Office Action for U.S. Appl. No. 08/947,798 dated Sep. 20, 2007, 7pp.
Office Action for U.S. Appl. No. 08/947,798 dated Jun. 6, 2007, 14pp.
Office Action for U.S. Appl. No. 08/947,798 dated Dec. 18, 2006, 21pp.
Office Action for U.S. Appl. No. 08/947,798 dated Aug. 24, 2006, 8pp.
Office Action for U.S. Appl. No. 08/947,798 dated Jul. 12, 2006, 2pp.
Office Action for U.S. Appl. No. 08/947,798 dated Mar. 9, 2006, 15pp.
Office Action for U.S. Appl. No. 08/947,798 dated Mar. 3, 2006, 2pp.
Office Action for U.S. Appl. No. 08/947,798 dated Jan. 12, 2005, 15pp.
Office Action for U.S. Appl. No. 08/947,798 dated May 20, 2004, 16pp.
Office Action for U.S. Appl. No. 08/947,798 dated Feb. 25, 2003, 12pp.
Office Action for U.S. Appl. No. 08/947,798 dated Dec. 12, 2002, 2pp.
Office Action for U.S. Appl. No. 08/947,798 dated Jul. 5, 2002, 20pp.
Office Action for U.S. Appl. No. 08/947,798 dated Aug. 16, 2001, 3pp.
Office Action for U.S. Appl. No. 08/947,798 dated May 8, 2001, 23pp.
Office Action for U.S. Appl. No. 08/947,798 dated Feb. 27, 2001, 1pp.
Office Action for U.S. Appl. No. 08/947,798 dated Oct. 26, 2000, 5pp.
Office Action for U.S. Appl. No. 08/947,798 dated Jan. 20, 2000, 17pp.
Office Action for U.S. Appl. No. 09/012,163 dated Jul. 6, 2000, 22pp.
Office Action for U.S. Appl. No. 09/012,163 dated Jan. 10, 2001, 13pp.
Office Action for U.S. Appl. No. 09/012,163 dated Sep. 29, 1999, 20pp.
Office Action for U.S. Appl. No. 09/012,163 dated Feb. 29, 2000, 7pp.
Notice of Allowability for U.S. Appl. No. 09/012,163 dated Jul. 19, 2001, 4pp.
Notice of Allowability for U.S. Appl. No. 09/012,163 dated Nov. 27, 2001, 4pp.
Notice of Allowability for U.S. Appl. No. 08/822,709 dated Jan. 16, 2001, 3pp.
Office Action for U.S. Appl. No. 08/822,709 dated Feb. 17, 2000, 6pp.
Office Action for U.S. Appl. No. 08/822,709 dated Oct. 8, 1999, 2pp.
Office Action for U.S. Appl. No. 08/822,709 dated Jun. 23, 1999, 5pp.
Decision of Petition to Make Special for U.S. Appl. No. 08/822,709 dated Sep. 5, 1997, 1pp.
Office Action for U.S. Appl. No. 09/836,409 dated Oct. 1, 2001, 6pp.
Interview Summary for U.S. Appl. No. 09/836,409 dated Apr. 29, 2002, 2pp.
Notice of Allowability for U.S. Appl. No. 09/836,409 dated May 1, 2002, 3pp.
Notice of Allowability for U.S. Appl. No. 09/836,409 dated Sep. 25, 2002, 3pp.
Office Action for U.S. Appl. No. 09/836,409 dated Nov. 20, 2002, 4pp.
Notice Allowability for U.S. Appl. No. 09/836,409 dated Jan. 7, 2003, 3pp.
Notice of Allowability for U.S. Appl. No. 10/424,362 dated Nov. 4, 2004, 6pp.
Office Action for U.S. Appl. No. 10/424,362 dated Sep. 24, 2004, 3pp.
Office Action for U.S. Appl. No. 10/424,362 dated Jun. 9, 2004, 7pp.
Office Action for U.S. Appl. No. 10/424,362 dated May 6, 2004.

Office Action for U.S. Appl. No. 10/424,362 dated Nov. 19, 2003, 10pp.
Office Action for U.S. Appl. No. 11/058,653 dated May 15, 2007, 5pp.
Office Action for U.S. Appl. No. 11/425211 dated Mar. 26, 2008, 5pp.
Office Action for U.S. Appl. No. 11/425,211 dated Sep. 15, 2006, 2pp.
Office Action for U.S. Appl. No. 11/425,228 dated Jul. 25, 2007, 6pp.
Notice of Allowability for U.S. Appl. No. 08/920,116 dated Oct. 25, 1999, 7pp.
Office Action for U.S. Appl. No. 08/920,116 dated Oct. 1, 1999, 7pp.
Office Action for U.S. Appl. No. 09/442,754 dated Aug. 2, 2000, 10pp.
Office Action for U.S. Appl. No. 09/442,754 dated Jan. 16, 2001, 9pp.
Office Action for U.S. Appl. No. 09/442,754 dated Aug. 1, 2001, 6pp.
Notice of Allowability for U.S. Appl. No. 09/442,754 dated Oct. 18, 2001, 4pp.
Notice of Allowability for U.S. Appl. No. 09/442,754 dated Jan. 7, 2003, 8pp.
Supplemental Notice of Allowability for U.S. Appl. No. 09/442,754 dated Mar. 4, 2003, 5pp.
Office Action for U.S. Appl. No. 09/442,754 dated Mar. 6, 2003, 2pp.
Notice of Noncompliant Amendment for U.S. Appl. No. 10/625,089 dated Sep. 10, 2007, 11pp.
Office Action for U.S. Appl. No. 10/625,089 dated Jun. 20, 2007, 2pp.
Office Action for U.S. Appl. No. 10/625,089 dated Apr. 5, 2006, 7pp.
Office Action for U.S. Appl. No. 10/625089 dated Oct. 24, 2005, 7pp.
Office Action for U.S. Appl. No. 10/625,089 dated Sep. 10, 2007, 11pp.
Foreign Office Action for Serial No. 2284662 dated Jan. 29, 2003, 3pp.
Notice of Allowance for Serial No. 2284662 dated Oct. 3, 2003, 1pp.
Foreign Office Action for Serial No. 98913082.8 dated Jul. 24, 2006, 4pp.
Foreign Office Action for Serial No. 545921/98 dated Feb. 7, 2003, 5pp.
International Search Report for Application No. PCT/US99/01089 dated May 11, 1999, 1pp.
Office Action for U.S. Appl. No. 09/164,670 dated May 11, 2000, 10pp.
Office Action for U.S. Appl. No. 09/164,670 dated Jan. 4, 2001, 8pp.
Notice of Allowance for U.S. Appl. No. 09/164,670 dated Jul. 16, 2001, 4pp.
International Search Report for PCT/US96/13718 dated Nov. 7, 1996, 3pp.
European Search Report for EP 97/122695 dated Nov. 10, 1998, 3pp.
International Search Report for PCT/US98/17340 dated Dec. 17, 1998, 1pp.
International Search Report for EP 97/122899 dated Aug. 9, 1999, 2pp.
Written Opinion for Application No. PCT/US99/01089 dated Feb. 1, 2000, 4pp.
Preliminary Exam Report for Application No. PCT/US99/01089 dated Jan. 22, 2000, 4pp.
"VendMaster: Windows and Vending Software News", Independent Vendors Association Quaterly, (http//wwwvendmaster.com/news_mainhtml), Apr./May/Jun. 1997, 10pp.
NCR 7453 PC-Based Point-of-Sale Solution, Copyright 1998 NCR Corporation, 2pp.
Herman, Ken, "Auchan Cashes in on Lottery", Houston Post, Sec A, p. 15, col. 5. Jul. 1, 1992, 5pp.
Raab, David M., "Package Aids Catalog Management", DM News, Apr. 22, 1996, Section: Software Review, p. 14, 2pp.
Brochure: "POSitive Input; The McDonald's POS-3 System Newsletter from Olivetti Solutions/OLSY", 1998, 7 pp.
Silverman, Gene, "Planning and using infomercial campaigns effectively.", Direct Marketing, Sep. 1995, vol. 58, No. 5, p. 32(3).3 pp.
Bigger Plans (Provident Bank, issuer of MeritValue customer loyalty card, plans to offer program in 25 cities in six months), Card Fax, Oct. 7, 1996, vol. 96. No. 178, 1 pg.
"Georgia Almanac", Georgia Almanac, Jan. 26, 1983, BC Cycle, Section: Regional News, 2 pp.

"Major Appliances: Tappan unveils microwave oven feature preprogrammed controls.", HFD, Sep. 10, 1984, 1 pg.
Herman, Ken, "Lottery's losers: Small stores; Big Pots bring big Problems", Austin American-Statesman, Nov. 23, 1996, Section: News, 4 pp.
"Universal Holding Cabinet Rollout Program", H & K Dallas Inc., Winter 1998, 6 pp.
Quittner, Jeremy, "Ohio's Provident brings its discount card to Fla.", American Banker, Feb. 11, 1997, vol. 162, Issue 28, p. 11, 1/3p., ISSN: 0002-7561, 2 pp.
Symons, Allene, "Lucky, Sav on debut Rewards Card.", Drug Store News, Feb. 17, 1997, vol. 19, Issue 4, p. 3, 2p, 1c, ISSN: 0191-7587, 2 pp.
Mckeveny, Alexander, "Giving them a good reason.", Bank Marketing, Mar. 1997, vol. 29, Issue 3, p. 37, 4p, 4c, ISSN: 0888-3149, 5 pp.
Rossides, M., Heads I win, Tails you lose, Jun. 13, 1992, 1 pg.
"Cash Machines Offer a Whole Lotto Money for Withdrawal" Crain's Chicago Business, Jun. 19, 1995, Sec. News, p. 8, 3pp.
Kelsy, John and Schneier, Bruce, "Conditional Purchase Orders", Fourth AMC Conference on Computer Communications Security, ACM Press, Apr. 1997, 8pp.
Prochaska-Cue, Kathy, "Acquiring Credit", (http//ianrwww.unl.edu/IANR/PUBS/NEDFACTS/NF91-2.htm), download date: Sep. 3, 1997, 4pp.
Website: "Welcome to Onsale", (http.www.onsal.com) download date: Sep. 9, 1997, 15pp.
Website: "IAO-Onsale-GSCI-Zaution_Cyperswap-Auction World", (http.www.iaoauction.com/abouthtm), download date: Sep. 8, 1997, 10pp.
Kirk, Jim, "Digital Promotions Make Quick Point—McDonald's testing new technology on its menus", Chicago Tribune, Dec. 26, 1997, 2 pp.
Brochure: "It's in the Bag. Introducing the Universal Holding Cabinet from Welbilt", Frymaster Corporation, 1998, 5 pp.
"Progressive Introduces Kitchen Display System (KDS) for Restaurants", PR Newswire, Jan. 23, 1998, Section: Financial News, 2 pp.
"JICC Coupon Guide Recommends Upgrades at Front End", Supermarket News, Feb. 9, 1998, Section: p. 23, ISSN: 0039-5803, 2 pp.
Livingston, Kimball, "In-Store systems, VideOcart Redux", Retail Tech Magazine, Mar. 1998, pp. 29-30, 2 pp.
Website: "Advanced Mechanics Internet Specials", (http //www metroplexweb com/advcpn2 htm), download date: Mar. 12, 1998, 4 pp.
Hamstra, Mark, "Segment Study: 'Made-for-you' maneuvers signal competitive shift n QSR category", Nation's Restaurant News, Apr. 13, 1998, 6 pp.
"The Northwest German State Lottery — Your Invitation to Play", (http //www germanstatelottery com/invitation html), download date: May 14, 1999, 2 pp.
"Official Lottery Rules", (http //www gloeckle com/bedingungen/main html), download date: May 14, 1999, 5 pp.
Website: "What actually is the SKL?", (http //www gloeckle com/das_spiel/rechts html), download date: May 14, 1999, 3 pp.
"Epson Partners With International Lottery & Totalizator Systems; Epson's New Acclaim Program Wins With Gaming Market", Business Wire, Jun. 7, 1999, 2 pp.
"The Change Game", Georgia State Lottery Ticket—Mega Millions Jackpot, Draw date Aug. 8, 2002, 1 pg.
Website: "Georgia Lottery Corporation—Change Game", (http //www Georgialottery com/lottery/changegame html), download date: Dec. 4, 2002, 5 pg.
Website: "Michigan Lottery", (http www Michigan gov/lottery/0,1607,7-110-812_21193_21321---,00 html), download date: Dec. 4, 2002, 3 pp.
Website: "The Change Game—Turning Loose Change Into Lottery Dollars", (http www berschgaming com/about_the_game htm), download date: Dec. 4, 2002, 1pp.
ThenEconomist, Head I win, Tails you lose, Business; p. 74, 1992, 1pp.
U.S. Appl. No. 08/947,798, filed Oct. 9, 1997, Tedesco.
U.S. Appl. No. 09/152,905, filed Sep. 14, 1998, Tedesco.
U.S. Appl. No. 09/164,670, filed Oct. 1, 1998, Walker.
U.S. Appl. No. 09/012,163, filed Jan. 22, 1998, Walker.

Notice of Allowance for U.S. Appl. No. 08/947,798 mailed Feb. 6, 2009, 4 pp.
Office Action for U.S. Appl. No. 08/947,798 mailed Nov. 25, 2008, 24 pp.
Office Action for U.S. Appl. No. 08/947,798 mailed May 5, 2008, 25 pp.
Notice of Allowance for U.S. Appl. No. 11/926,768 mailed Nov. 16, 2009, 7 pp.
Notice of Allowance for U.S. Appl. No. 11/926,768 mailed Jun. 17, 2009, 7 pp.
Office Action for U.S. Appl. No. 11/926,839 mailed Jul. 8, 2010, 24 pp.
Office Action for U.S. Appl. No. 11/926,839 mailed Mar. 17, 2010, 23 pp.
Notice of Allowance for U.S. Appl. No. 11/926,948 mailed Jun. 14, 2010, 7 pp.
Office Action for U.S. Appl. No. 11/926,948 mailed Nov. 12, 2009, 17 pp.
Office Action for U.S. Appl. No. 11/926,948 mailed Feb. 24, 2009, 16 pp.
Office Action for U.S. Appl. No. 11/926,948 mailed Sep. 8, 2008, 14 pp.
Office Action for U.S. Appl. No. 11/611,342 mailed Mar. 30, 2010, 5 pp.
Notice of Allowance for U.S. Appl. No. 11/058,653 mailed Jul. 22, 2008, 5 pp.
Notice of Allowance for U.S. Appl. No. 11/058,653 mailed Mar. 4, 2008, 8 pp.
Notice of Allowance for U.S. Appl. No. 11/425,211 mailed Feb. 9, 2009, 7 pp.
Notice of Allowance for U.S. Appl. No. 11/425,228 mailed Oct. 8, 2008, 7 pp.
Office Action for U.S. Appl. No. 11/425,228 mailed May 12, 2008, 8 pp.
Office Action for U.S. Appl. No. 11/425,232 mailed Mar. 18, 2008, 6 pp.
Notice of Allowance for U.S. Appl. No. 11/456,342 mailed May 1, 2008, 4 pp.
Notice of Allowance for U.S. Appl. No. 10/625,089 mailed Oct. 6, 2008, 10 pp.
Notice of Allowance for U.S. Appl. No. 10/625,089 mailed Apr. 2, 2008, 10 pp.
Notice of Allowance for U.S. Appl. No. 11/926,948 mailed Sep. 29, 2010, 6 pp.

* cited by examiner

| PRODUCT DESCRIPTION 310 | PRODUCT DISPENSER IDENTIFIER 320 | PRODUCT COST 330 | PRODUCT PRICE 340 | CURRENT DEMAND RATE 350 | QUANTITY REMAINING 360 | EXPIRATION/ RESTOCK DATE 370 |
|---|---|---|---|---|---|---|
| COKE® | A1 | $0.30 | $0.75 | 1 / 9 HOURS | 12 | 2/15/99 |
| DIET COKE® | A2 | $0.25 | $0.75 | 1 / 10 HOURS | 9 | 2/15/99 |
| SUNKIST® | A3 | $0.30 | $0.65 | 1 / 15 HOURS | 15 | 2/15/99 |
| SNACK 1 314 | B1 | $0.25 | $0.50 | 1 / 12 HOURS 354 | 21 | 2/20/99 374 |
| SNACK 2 | B2 | $0.20 | $0.50 | 1 / 11 HOURS | 21 | 2/20/99 |
| SNACK 3 | B3 | $0.20 | $0.65 | 1 / 10 HOURS | 14 | 2/20/99 |

| ORIGINALLY REQUESTED PRODUCT 410 | ALTERNATE PRODUCT 420 | APPLICABLE ALTERNATE PRODUCT OFFER RULES 430 | ALTERNATE PRODUCT OFFER MESSAGE 440 | HISTORICAL ACCEPTANCE RATE 450 | ACCEPTANCE SIGNAL 460 |
|---|---|---|---|---|---|
| A1 | A2 | N/A 431 | <C:\WAVE_FILE1> 441 | 70% | A2 |
| C_ | C_ | ALTERNATE PRODUCT MARGIN > ORIGINALLY REQUESTED PRODUCT MARGIN 432 | "WHY NOT TRY BRAND [ ] INSTEAD? JUST PRESS C[ ]." 442 | 57% | C_ |
| B1 | B2 | ALTERNATE PRODUCT QUANTITY > 5 REMAINING 433 | <C:\OFFER.MP3> 443 | 29% | B2 |
| C1 | C3 | ORIGINALLY REQUESTED PRODUCT'S DEMAND RATE ≥ 1 / 5 HOURS 434 | "WHY NOT TRY BRAND [ ] INSTEAD? JUST PRESS C3." 444 | 45% | C3 |
| C1 | C_ | ALTERNATE PRODUCT'S DEMAND RATE < 1 / 17 HOURS 435 | "WHY NOT TRY BRAND [ ] INSTEAD? JUST PRESS C2." 445 | 47% | C_ |
| C2 | C3 | ALTERNATE PRODUCT'S EXPIRATION/ RESTOCK DATE < ORIGINALLY REQUESTED PRODUCT'S EXPIRATION/RESTOCK DATE 436 | "WHY NOT TRY BRAND [ ] INSTEAD? JUST PRESS C3." 446 | 81% | C3 |
| C3 | C1 | ALTERNATE PRODUCT WILL EXPIRE IN 3 DAYS 437 | "WHY NOT TRY BRAND [ ] INSTEAD? JUST PRESS C1." 447 | 72% | C1 |
| B2 | C3 | ALTERNATE PRODUCTS ACCEPTANCE RATE > 90% 438 | "WHY NOT TRY BRAND [ ] INSTEAD? JUST PRESS C3." 448 | 95% 458 | C3 |

VENDING MACHINE SYSTEM AND METHOD FOR ENCOURAGING THE PURCHASE OF PROFITABLE ITEMS

CROSS-REFERENCE TO RELATED APPLICATIONS

The present application is a continuation of U.S. patent application Ser. No. 09/345,092, filed Jun. 30, 1999, entitled "VENDING MACHINE SYSTEM AND METHOD FOR ENCOURAGING THE PURCHASE OF PROFITABLE ITEMS", which is to issue on Jul. 24, 2007 as U.S. Pat. No. 7,249,050; which is incorporated by reference herein in its entirety;

which is a continuation-in-part of U.S. patent application Ser. No. 09/164,670, filed Oct. 1, 1998, for "METHOD AND APPARATUS FOR COLLECTING AND APPLYING VENDING MACHINE DEMAND INFORMATION", which issued on Nov. 27, 2001 as U.S. Pat. No. 6,324,520;

which is a continuation-in-part of: U.S. patent application Ser. No. 09/012,163, filed Jan. 22, 1998, for "METHOD AND APPARATUS FOR AUTOMATICALLY VENDING A COMBINATION OF PRODUCTS", which issued on May 28, 2002 as U.S. Pat. No. 6,397,193;

which is a continuation-in-part of:

(a) U.S. patent application Ser. No. 08/947,798, filed Oct. 9, 1997 for "METHOD AND APPARATUS FOR DYNAMICALLY MANAGING VENDING MACHINE INVENTORY PRICES", and (b) U.S. patent application Ser. No. 08/920,116, filed Aug. 26, 1997, for "METHOD AND SYSTEM FOR PROCESSING SUPPLEMENTARY PRODUCT SALES AT A POINT-OF-SALE TERMINAL", which issued on Sep. 12, 2000 as U.S. Pat. No. 6,119,099, which is a continuation-in-part of U.S. patent application Ser. No. 08/822,709, filed Mar. 21, 1997, for "SYSTEM AND METHOD FOR PERFORMING LOTTERY TICKET TRANSACTIONS UTILIZING POINT-OF-SALE TERMINALS", which issued on Jul. 21, 2001 as U.S. Pat. No. 6,267,670.

The present application is also related to U.S. patent application Ser. No. 11/456,342 filed Jul. 10, 2006 and entitled "VENDING MACHINE SYSTEM AND METHOD FOR ENCOURAGING THE PURCHASE OF PROFITABLE ITEMS".

FIELD OF THE INVENTION

This invention relates generally to systems and methods for delivering products-on-demand to individuals and, more particularly, to delivery via vending machines.

BACKGROUND OF THE INVENTION

Vending machines are well-known fixtures of modern life and may be broadly described as machines that dispense food, drinks, chewing gum, toys, toiletries, or some other type of merchandise in exchange for money or tokens. A principal advantage of dispensing products via vending machines is that they provide uninterrupted access to the goods contained therein, thereby allowing consumers to make purchases at times convenient for them. The vending machine operator also benefits in that the cost of providing an attendant to collect the money and distribute the goods is reduced to roughly the cost of purchasing or leasing and operating the machine. Sales volumes that would be much too low to justify hiring an attendant to distribute the goods can often be profitable for a vending machine operation.

Of course, unattended operation is both a strength and a weakness of a vending system. It is a weakness to the extent that a conventional vending machine cannot do what a human attendant might: attempt to influence the consumer's buying decision to benefit the owner's objectives. For example, a human salesperson might attempt to increase the profit obtained from a paying customer by suggesting that the customer should consider purchasing a different product than the one originally selected, a product that has a higher profit margin. Similarly, a human can try to direct customers toward a product item that is nearing its expiration date, so that the item might be sold before it must be pulled from the shelves and discarded. In brief, the sales attendant can attempt to dynamically influence the buying decision of a consumer during the sale process to suit the seller's needs.

It is, of course, the nature of a conventional vending machine to respond automatically and unthinkingly to a product selection request from a customer. However, this operating model may be inconsistent with the needs of the vending machine owner/operator, who might have a variety of products with differing profit margins or expiration dates loaded into the same machine. Instead, an operator might wish to emphasize the sale of one product over another for any number of reasons, but primarily in order to maximize his or her profit. Conventional vending machines, though, offer little help in this regard.

The vending machine arts have seen a good deal of innovation in recent years, but no one has yet addressed the problem introduced above, namely, how best to influence the buying decision of a ready, willing, and able buyer who has made an initial product selection. Some inventors have focused on approaches such as static displays aimed at influencing the customer's initial purchase decision before the sales transaction begins. See, e.g., Bachmann et al., "Display Panel for Vending Machines", U.S. Pat. No. 4,551,935, and Hetrick et al., "Automatic Transaction System with a Dynamic Display and Methods of its Operation", U.S. Pat. No. 5,831,862. However, neither of these patents disclose or suggest alternate products to the customer after the initial product selection has been made.

Others are experimenting with vending machines that are in communication with a central computer via a network, thereby letting the company monitor inventory in distant locales and change prices dynamically in response to local demand. Among the contemplated uses for this machine include variable pricing based on the time of day, temperature, and the past demand for a product. However, under this model prices are changed "after the fact" at a point when it is too late to influence the purchase behavior of a currently ready, willing, and able buyer.

Still others have developed "revenue managed vending machines" that dynamically adjust prices according to substantially real-time readings of supply and demand. See, for example, the co-pending application by Tedesco et al., application Ser. No. 08/947,798, filed on Oct. 9, 1997, the disclosure of which is incorporated herein by reference. Revenue managed vending machines automatically make pricing decisions based on recent measurements of supply and demand, and their prices can potentially be altered after each purchase. The data received during a given transaction can be used to make the next transaction more profitable.

Other approaches to profit maximization include vending machines that are configured to offer "package deals" and "upsells", where high demand products may be advantageously paired with low demand products in a promotional effort to leverage the popularity of one product against distressed and possibly perishable inventory. These vending machines may additionally offer supplemental products to the buyer of an initial product in an effort to boost sales. However, both of these aspects require the buyer to purchase more than one product in order to obtain a discount; and neither presents an alternate product offer to a ready and willing buyer. Tedesco et al., in application Ser. No. 09/012,163, filed on Jan. 22, 1998, which issued on May 28, 2002, as U.S. Pat. No. 6,397,193, teach one such vending approach, the disclosure of which is incorporated herein by reference.

Finally, co-pending U.S. application Ser. No. 09/164,670, filed Oct. 1, 1998, which issued on Nov. 27, 2001, as U.S. Pat. No. 6,324,520, the disclosure of which is incorporated herein by reference, teaches a vending machine that offers products to undecided customers and suggests substitute products when the originally selected item is out of stock. The substitute product can be designated by the operator, based on historical likelihood of acceptance, or based on average selection time. This general approach works to offer a substitute product only when the requested product is unavailable.

In summary no one has yet discovered a method by which the ready-and-willing buyer can be encouraged to take a product different from the one originally selected, with the alternate product being chosen so as to better optimize profitability of the vending machine owner/operator.

Heretofore, as is well known in the vending arts, there has been a need for an invention to address and solve the above-described problems. Accordingly, it should now be recognized, as was recognized by the present inventors, that there exists, and has existed for some time, a very real need for a vending system and apparatus that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided herein a disclosure of a vending machine method and apparatus that is designed to optimize one or more operating parameters, such as profit, by offering an alternate product to an identified buyer after the buyer has made an initial product section. The product that is offered in the alternative will be one, which, typically, better addresses the objectives of the seller than the originally selected product. Accordingly, the inventive machine markets to customers during a sales transaction.

According to a first embodiment, the instant invention receives some indication that a buyer wishes to purchase a particular type of good. The customer typically indicates his or her choice by depositing fluids into the machine and pressing a selection button on the machine's face. Based on this information, a microprocessor determines whether there is another product that might be offered to the buyer, which would yield more profit than the originally requested product. If there is none that is more profitable, the transaction concludes normally: the customer receives the selected item and any change due. However, if there is another product with a higher profit margin, an offer message is presented to the customer, which suggests that he or she should consider purchasing that product. The offer message is presented to the buyer through an output device such as a light emitting diode (LED) display. The buyer then responds by either accepting or declining the offer, after which the vending machine dispenses an item corresponding to either the original product selection or the alternate product according to the buyer's response. If the consumer accepts the alternate product offer, the vending machine operator will make more money on this transaction than he or she would have made if the original product had been vended as requested. Consequently, in the instant embodiment, the vending machine logic seeks to optimize the profit potential of a given transaction by offering alternate products to the customer during the sale that are more profitable than the original selection, and, especially, by offering the alternate product that is the most profitable.

The instant inventors have devised many variations of the approach described in the previous paragraph, wherein other criteria or decision rules are used to control the selection of alternate products. For example, the machine might be programmed to offer a specific alternate product whenever a buyer selects a particular product, i.e., rather than searching for a "best" available alternative. Additionally, the machine may be programmed to offer only certain classes of products in the alternative (e.g., only beverages might be offered as alternates if a beverage is originally selected, or only snacks if a snack is selected). Further, certain products may be offered in the alternative only if sufficient inventory of the alternate product is available. Even further, an alternate product may be offered if the originally requested product is a higher-demand product, and this is especially so if the stock-on-hand of the requested product is dwindling. Still further, a product may be offered as an alternative if its demand rate is lower, a rule that could be used to stimulate sales of slow-moving products.

Other preferred decision rules include extending an offer for an alternate product if the remaining shelf life of the alternative (as measured by, for example, the expiration date of items of that type in the machine) is less than that of the originally selected product. Similarly, no alternate product may be offered if the original selection has a shorter shelf life remaining than the contemplated alternative. Further, an alternate product may be offered if it is within a predetermined number of days of its expiration date. Similarly, an original selection that might otherwise qualify for an alternate offer will not have such an offer presented if, for example, the expiration date of the original product is within less than a predetermined number of days. Finally, the vending machine may be programmed to offer only those alternate products that have historically demonstrated a likelihood of being accepted if they are offered as alternatives.

In still another embodiment, the machine may be programmed to offer a discount on the alternate product as an inducement to the buyer to accept the alternative. This approach might be useful where there is a low demand product and the discount is offered to stimulate sales; or, where there are product items that have a limited remaining shelf life and the vendor is faced with the prospect of a total loss of the value of the product if it cannot be sold in time. The discounted price of the alternate product is preferably not shown to the customer until he or she requests a higher demand product. Thus, if the customer initially requests the lower demand or soon-to-expire product, the full price will be paid for it.

Another variation of the previous embodiment could be used when the original and substitute items are approximately equal in retail price. In that case, the system would preferably offer the substitute product at a discount. Then, at the conclusion of the transaction, the change owed to the customer would typically be dispensed as usual, the returned change including the amount of the discount, if the customer had accepted the offer. However, rather than returning cash to the customer. The previous examples have all been directed toward offers that are presented (or not) to the customer and, after the customer receives the merchandise, the transaction ends. However, the general framework described previously may also be used to influence, not just the current transaction, but future transactions as well. For example, the vending machine may be designed to offer an incentive to purchase a product again in the future if the customer agrees to take an alternate product now. A preferred form of this incentive is a discount on a future purchase. This might be implemented by providing the customer with an alphanumeric coupon code that could be entered into the machine at a later date for redemption of the future discount. It might be desirable in some settings to return a (magnetic) coupon equal to the amount of the change; equal to some multiple of the amount of change (e.g., 110% of the amount of the discount); or, even a coupon good for a "free" item. The free item coupon could be redeemed at a later date for a product specified by the vending machine operator, a product that would typically be most profitable to the operator. Alternatively, a coupon might be issued for a "mystery item", and the customer would not know until the time when it is redeemed exactly which product he or she would be receiving. Such a code could be manually entered into an input device such as a keypad or entered via optical scanner (e.g., a bar-code reader or entered through the use of a magnetic strip coupon reader). In the preferred embodiment, the code would be expiring and would include an indication of the expiration date within the code itself, so that a database of such offers need not be maintained, although maintenance of such a database would certainly be possible and feasible, as would be apparent to one of ordinary skill in the art.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Further, the disclosure that follows is intended to cover all alternatives, modifications and equivalents as may be included within the spirit and scope of the invention as defined by the appended claims. Finally, it should be understood that the phraseology and terminology employed herein are for the purpose of description and should not be regarded as limiting, unless the specification specifically so limits the invention.

While the instant invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which:

FIG. 3 illustrates some preferred data items that would be used to determine whether an alternate product should be offered;

FIG. 4 illustrates the operation of various of the alternate product decision rules discussed herein; and, FIG. 5 contains a flow chart that illustrates steps of the instant invention.

DETAILED DESCRIPTION OF THE INVENTION

Hardware Components

Figure 1:
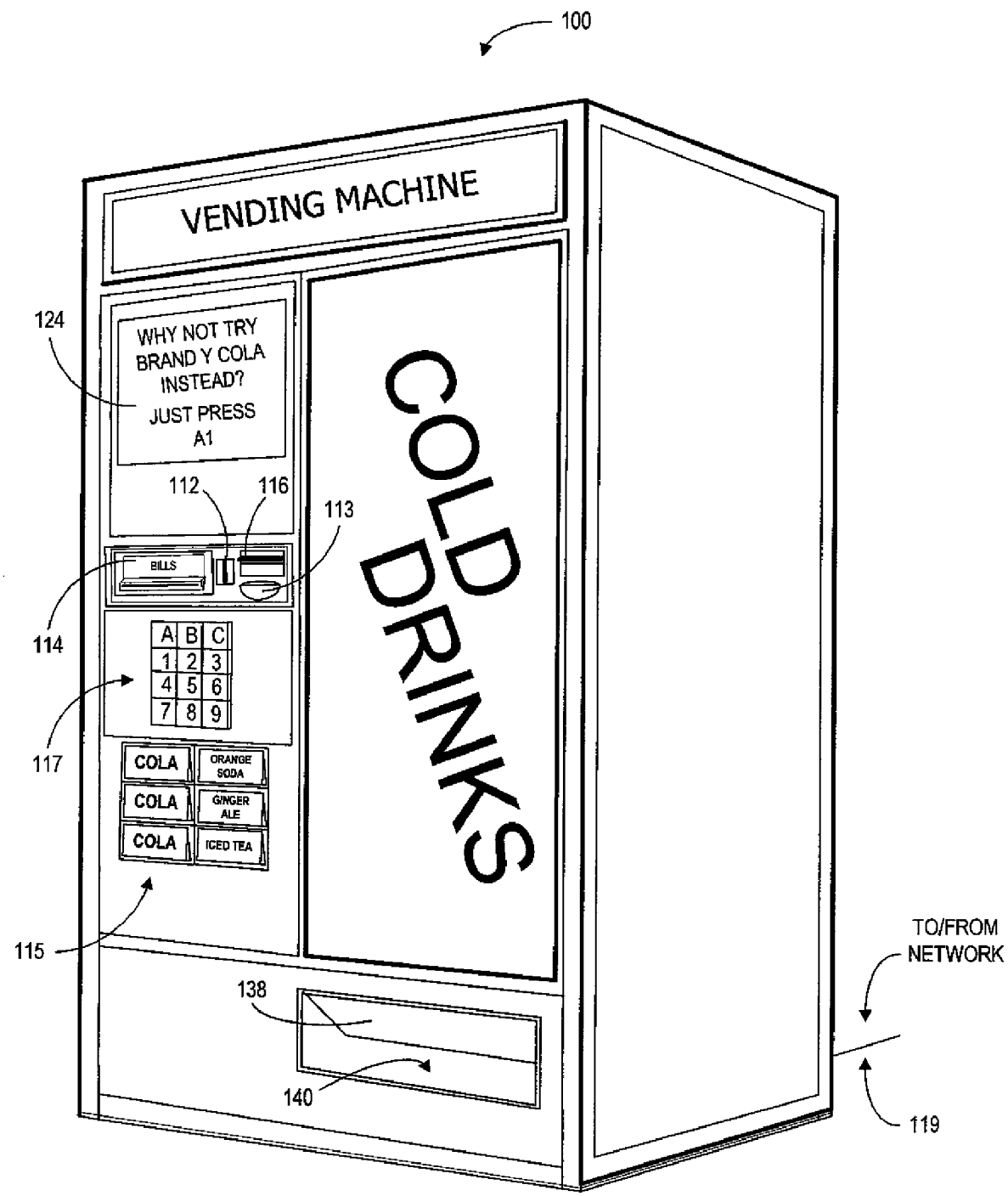
FIG. 1 illustrates front perspective view of the instant invention as embodied in a vending machine apparatus.

A vending machine 100 that would be generally suitable for implementing the instant invention is illustrated in FIG. 1. It should be noted that the term "vending machine" will be used herein in the broadest sense of the term to include any automatic sales device: that accepts payment from a consumer; that can sense a consumer choice; and, that dispenses at least one of a plurality of types of goods in accordance with the wishes of the consumer. The term "good" will also be used in its broadest sense to include the broad range of traditionally vendible products—e.g., food, beverages, novelties, etc.—as well as less traditional interpretations such as money (which is "vended" by a bill dispenser) and services (e.g., which are "vended" by phone machines).

In FIG. 1, the vending machine 100 is shown as containing such familiar fixtures as a bill reader/validate 114 and a coin slot 112 for accepting payment from the customer, a change bowl 113 to catch any change that is returned to the customer, and a product return well 140 (protected from the weather and from theft by flap 138) for dispensing the product to the customer. Card reader 116 provides the customer with another method of payment and is preferably at least able to read smart cards or credit/debit cards. The familiar product selection matrix 117 and/or product selection buttons 115 are provided so that the customer can signal a product choice to the vending machine and respond to queries therefrom.

In addition to the standard items described previously, the preferred vending machine external configuration preferably includes additional components such as a network connection 119 and an output device 124, which has been illustrated for purposes of specificity in FIG. 1 as a scrolling LED display.

Device 124 allows the CPU 126 to present various messages to the customer. In the preferred embodiment, output device 124 would be an LED-type display and might further include an audio speaker. However, it could also be, for example, a conventional video monitor, a touch-sensitive video monitor, or a printer. In brief, output device 124 is any device or combination or devices suitable for communicating a visually perceptible (including printed) or audible message to the customer.

Although FIG. 1 suggests that network connection 119 is a conventional land communications line (e.g., a telephone line, fiber optic line, coaxial line, twisted pair line), this connection could also be any of a variety of wireless connection types that are well known to those skilled in the art (e.g., wireless telephone, intra red communications, microwave transmission, or radio frequency transmissions).

Figure 2:
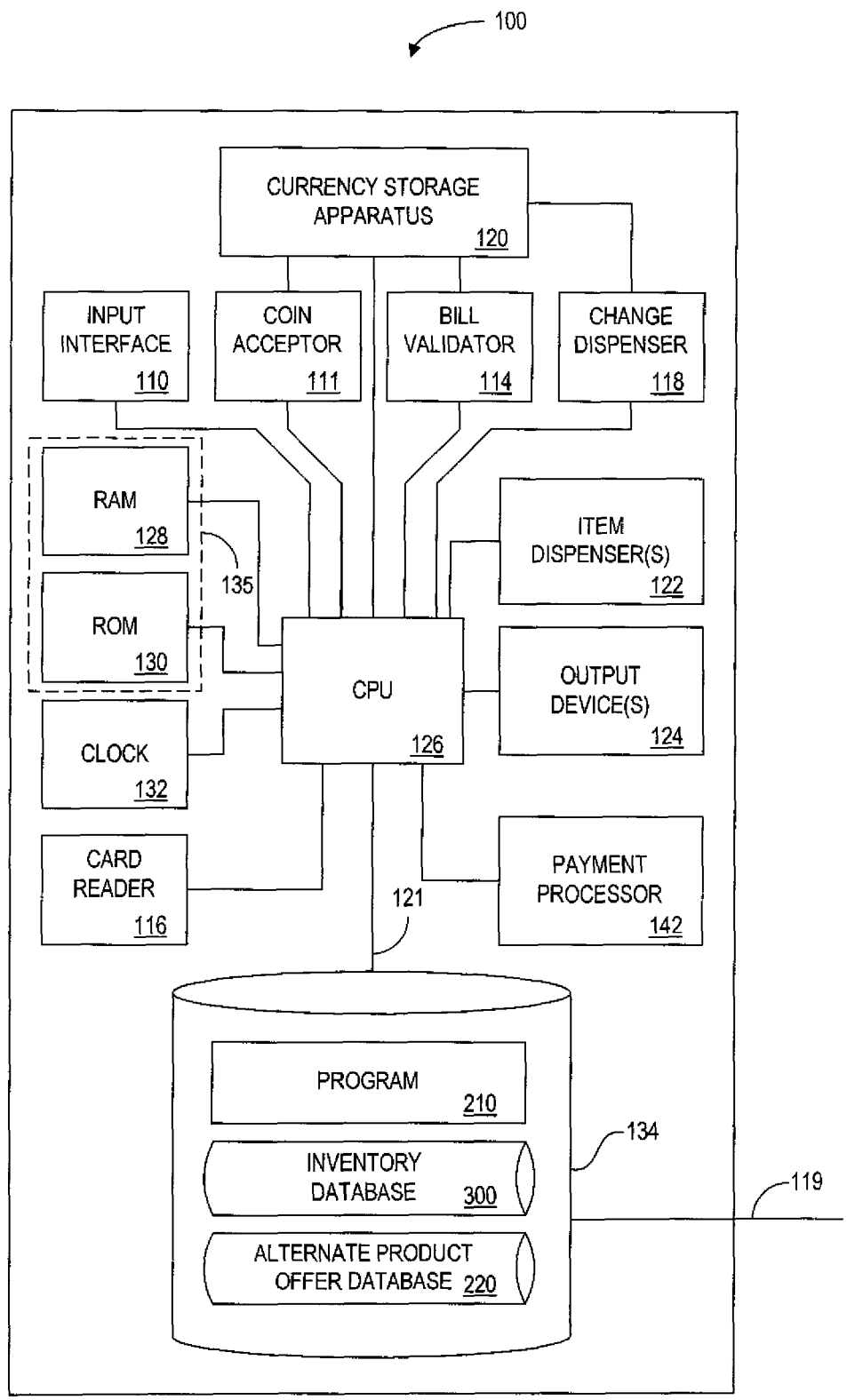
FIG. 2 contains a schematic diagram of the preferred hardware components of the vending machine embodiment of the instant invention.

Turning now to the internal workings of the vending machine 100, as is illustrated in FIG. 2, microprocessor ("CPU") 126 has access to and controls a number of additional internal devices not readily apparent to a customer. For example, the CPU 126 preferably controls the change dispenser 118, which returns specific amounts of money to the customer via change bowl 113. Currency storage apparatus 120 receives bills from the bill reader/validate 114, and coins from the coin slot 112 by way of coin acceptor 111, all of which are preferably in electronic communication with the CPU 126. Determination of whether the customer has paid too much, paid too little, or has tendered the correct amount is preferably made within payment processor 142. The CPU 126 will need to be in communication with and control the item dispenser 122, as this is the means by which the CPU 126 causes a particular product to be dispensed to the customer via item dispenser(s) 122.

Input interface 110 provides access by the CPU 126 to external customer selection signals originating on the front panel of the vending machine 100. These customer selection signals might originate from the product selection matrix 117, the product selection buttons 115, or from any other input devices on the exterior of the vending machine (e.g., output device 124, if that device is a touch-screen monitor or if it incorporates a microphone for use in speech recognition).

The CPU 126 will preferably have local access to computer memory 135 in which are stored computer instructions and data for recall and use by the CPU 126. Memory 135 may be any combination of volatile and/or nonvolatile memory (such as computer RAM 128 and computer ROM 130). Computer memory 135 preferably contains at least a minimal boot program, which is executed when the CPU 126 is powered up or reset.

Additional storage 134 is also provided for use by the CPU 126 and, in the preferred embodiment, this will be some sort of hard disk, but could also be, for example, computer RAM or computer ROM, a PROM chip, flash RAM, a ROM card, a RAM card, a floppy disk, a magnetic tape, a magneto-optical disk, an optical disk, a CD-ROM disk, or a DVD disk. Note that the storage 134 might be physically resident inside of the vending machine or accessible over a network connection via communications conduit 121 and/or network connection 119. Indeed the CPU 126 itself might be located remotely and control operations within the then-remote vending machine via network connection 119 and/or communications conduit 121.

Within the storage 134 would typically be found the computer instructions (i.e., one or more computer programs 210) necessary to implement the instant methods. Additionally, it is contemplated that the inventory database 300 and alternate product offer database 220 (both discussed below) would both be kept within this storage.

Finally, the instant invention preferably includes a clock/time circuit 132 in electrical communication with the CPU 126. This component provides the current date and time to the CPU 126 when required. It is additionally preferred that the clock circuit 132 be located within the vending machine 106, but that is not strictly required and network connection 119 could be used to provide remote access to this functionality.

In normal operation, a customer will initiate a transaction by making a product selection using keypad 117 (FIG. 1), item selection buttons 115, or via some other signaling scheme (for example, via a cell phone). It is preferred, though not required, that the consumer deposit an amount of money necessary to cover the cost of the selection before signaling his or her product choice. However, the instant system could be arranged to work in the instance—indeed, even to exploit the situation—where the customer has not tendered any money or has tendered an amount that is inadequate to purchase the selection.

The CPU 126 senses the customer's signals via input interface 110 and identifies the initial product section. Based on the initial selection, the CPU 126 might send one or more messages to the customer through output device 124. The customer will be given an opportunity to respond to the message and that response will be read by the CPU 126 via input interface 110. After the customer has made his or her wishes known, the transaction is completed by causing the agreed-upon product to be dispensed via item dispenser 112 and by returning any change owed to the customer. The vending machine is then ready for a next sale.

Vending Logic

In brief, the instant invention is designed to interact with the consumer after an item selection has been made by offering an alternate product to the customer. The alternate product of choice may be one that would be more profitable to the vending machine owner than was the original selection. The conditions under which the alternate product is offered are controlled by one or more rules, which are preferably stored in an alternate product offer database.

Figure 5:
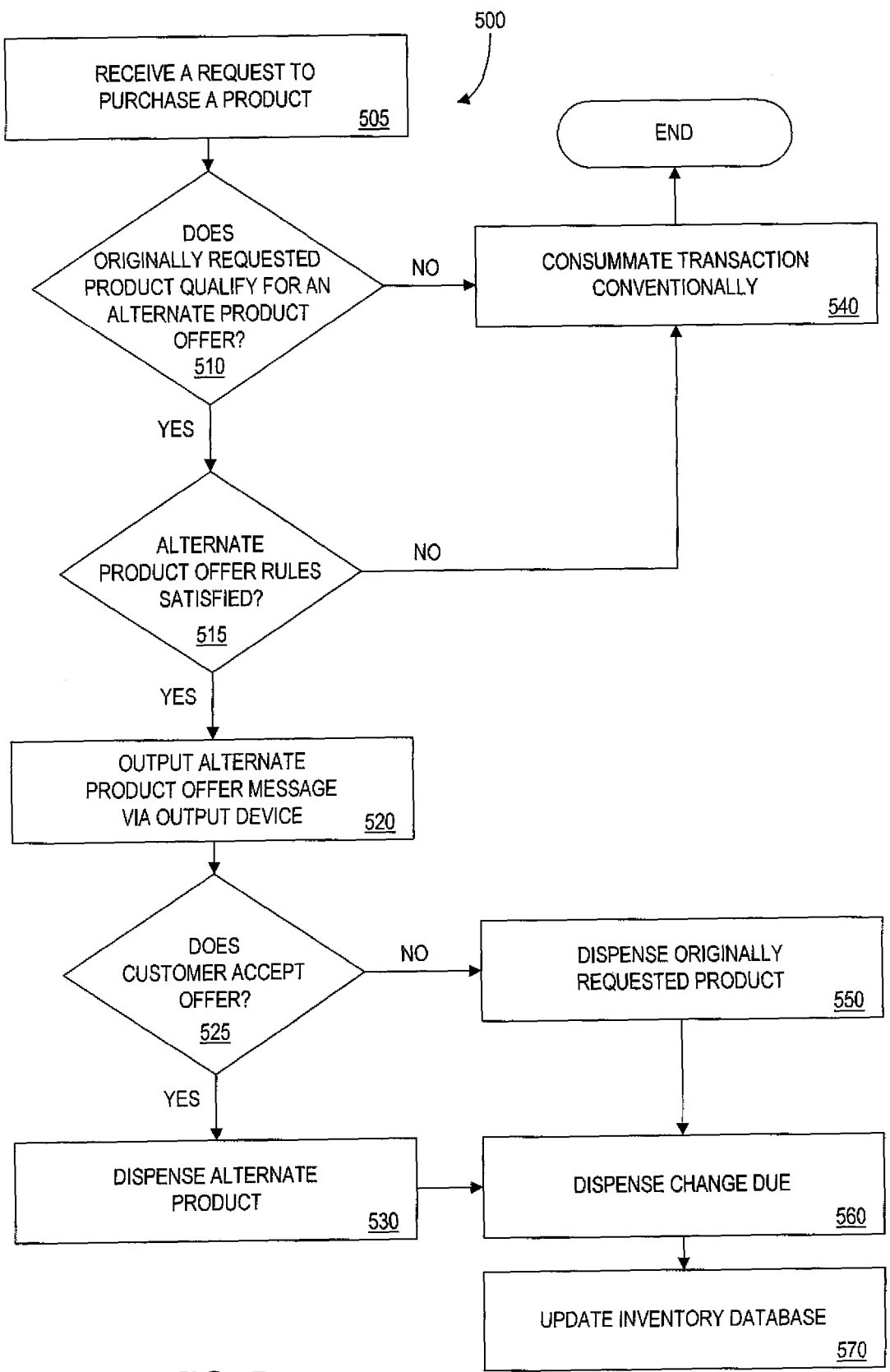

According to a preferred aspect of the instant invention, and as is broadly illustrated in FIG. 5, the instant method 500 begins with a request by a customer to purchase a product (step 505) dispensable by the vending machine 100. This request might also be accompanied by payment at the inception of the transaction, although that is not required and the instant method would proceed identically as described hereinafter, except, of course, that no product would be dispensed until adequate funds are deposited.

After receiving a product request from the customer, the instant method continues by determining whether the originally selected product qualifies for an alternate product offer (step 510), which step is preferably determined by consulting the alternate product offer database 220. This database 220 is preferably stored locally within the vending machine 100, however it could also be remotely accessed via communications conduit 121 and/or network connection 119. From this database 220, the qualifying product offers associated with or implicated by the original selection will be selected.

For purposes of the disclosure herein, a qualifying alternate product is any product that the vendor might want to offer a customer as an alternative to an original selection: any product implicated by a rule. In one embodiment, a qualifying alternate product offer is associated with a combination of a decision rule and an "Alternate product offer message". The decision rule states the circumstances under which the alternate product is to be offered. The "Alternate product offer message" contains the information that is presented to the consumer when all of the rule conditions are satisfied.

It may be that there are no offers in the database 220 that are associated with the original selection, in which case the sale will culminate conventionally (step 540). Or, there may be more than one alternate product that qualifies for presentation to the customer. In the later case, it is preferred that a single alternative be selected from among them and presented to the customer. Other variations are discussed below.

Once a single rule/offer message combination has been selected, the next step is to determine if the predicate conditions of the rule are satisfied (step 515). In the preferred embodiment, the vending logic operates according to the following general scheme:

Select a RULE associated with the original product selection;
Evaluate the RULE;
    If conditions of the RULE are satisfied, then
        Offer an alternate product;

```
        Obtain customer's response to the offer; and,
        Dispense the product chosen by the customer;
    ELSE
        Vend the product originally requested;
    END IF,
``` where RULE is any criterion, the state of which can be ascertained or estimated by the CPU 126. For example, if the CPU 126 is presented with a rule that directs it to offer an alternate product if the number of product items remaining of the alternate product is greater than 5 (FIG. 4, cell 433), a preferable first step is to determine the quantity remaining of the alternate product. Then, if this criterion is met (i.e., six or more items of this type remain in the vending machine 100), the customer is presented with an alternate product offer (step 520). On the other hand, if the criterion is not met, the second branch of the previous conditional expression would control and the originally selected product would be dispensed (step 550).

After the alternate offer message is presented, the vending machine 100 waits for a response from the customer. During that the time that the vending machine 100 is waiting, it could, for example, flash a light behind the alternate product selection button to assist the customer in locating it. Or, an animated graphic image of a hand pressing a button corresponding to the alternate product might be shown to the customer on display device 124.

The customer's response could take many forms, but typically one of three sorts of responses would be expected. In the first case, the customer might respond by doing nothing, i.e., not responding to the offer. This case could be recognized by measuring the length of time that has passed since the presentation of the alternate offer. If the measured response time were longer than, e.g., fifteen seconds, the originally requested product would preferably be automatically vended (step 550).

In a second—and most typical—case, the customer will either accept or decline the offer in the manner suggested by the product offer, i.e., by following its directions. That is, the customer might press a "YES" or a "NO" button to accept or decline the offer (these buttons could be hardware switches located on the face of the vending machine, or regions on the face of a touch-sensitive display, e.g., output device 124 in FIG. 1). Or, the customer might respond by making a selection from the keypad 117 or product selection buttons 115. That response could be an affirmation of the original choice (thereby declining the offer) or a selection corresponding to the alternate product. Further, the customer might speak his or her response into a microphone (generally input device 110), if voice recognition software is being employed and the customer is directed to respond in that matter.

Finally, an example of a third type of response would occur if the customer selected a product type different from both the original selection and the proposed alternate: if the customer did not follow instructions. More specifically, this situation would arise if Product A was the original selection, and Product B was offered in the alternative, but the customer selected Product C in response. In that case, the preferred vending machine 100 response would be to ask the customer to confirm this new choice in order to guard against the event the selection was accidental. The product dispensed would then be the one selected by the customer at this last step. Of course, many variations of this scheme are possible, including offering still another product alternative if the late-selected product so-qualifies.

No matter what form the customer's response takes, the CPU 126 will sense the response and direct the vending machine item dispenser 122 to vend the appropriate type of product (steps 550 or 530, as appropriate). Additionally, the customer's change (if any) will be dispensed 560 and an inventory database will preferably be updated 570 to reflect the removal from inventory of that particular product item.

Alternate Product Offer Database

In the preferred embodiment, alternate product offers and associated rules are stored within the alternate product offer database 220. As is illustrated by example in FIG. 4, a variety of different rule/message combinations might be maintained within this computer file 220, which is preferably stored locally within vending machine 100, but which could alternatively be kept at a central location and accessed via network connection 119.

The message that is presented to the customer could be any combination of visual and auditory information that is suitable for communicating the offer. The message could be presented in simple block text or by animated graphical images. It might also be spoken words that are digitized and stored on disk as, for example, ".WAV" (wave) or ".MP3" sound files (i.e., compressed audio files). Of course, the offer might also be formulated using any combination of the above. The language in which the offer is presented might be varied depending on the location of the machine or at the option of the customer. Additionally, music or some entertaining graphical display might be played for the customer on output device 124 while he or she is contemplating the offered alternative.

Finally, it should be noted that, especially in view of the foregoing, the exact components of output device 124 will depend on the type and format of the message, which is to be delivered to the customer. In general, the output device 124 should be taken to include whatever video and audio components are necessary to present the offer message in the appropriate format.

Alternate Product Offer Rules

Decision rules that are suitable for use with the instant invention could take many forms, some examples of which are presented in FIG. 4. Generally speaking, the outcome of a rule evaluation depends on the status of some quantity that can be estimated or determined by the CPU 126. Thus, it is preferable that the CPU 126 have access to the sorts of parameters listed in FIG. 3: parameters that are related to the operating environment of the vending machine 100.

In FIG. 4, the customer's original product selection appears within column 410. The alternate product (or alternate type or brand of product) appears in column 420. The circumstance under which the alternate product of column 420 will be offered (a "rule") is found in column 430. The message that is presented to the consumer if the selected product qualifies for an alternate offer is found in column 440. Column 450 contains the historical acceptance rate of each alternate product (or product family) as compared with another. This is an example of information that could be made a part of either the "Alternate product offer database 220" or the inventory database 300. Finally, the preferred signal by which CPU 126 recognizes that the customer has accepted the offer is indicated in column 460.

In the first row of FIG. 4, Rule 431 is the fundamental consideration rule "always offer Ad when Ac is selected". Thus, whenever a customer selects Ac a message 441 offering Ad as an alternative will be presented to the consumer (subject possibly to other fundamental considerations—such as product availability, discussed below). Note that a substantially equivalent variant of this rule is "always offer Ad", which presents the offer message for the alternative Ad whatever the original product selection (except, of course, when the original product selection is Ad). Finally, in this particular case, the offer message takes the form of an audio message that is "played" to the customer via an audio speaker (generally, output device 124). The "wave" computer file of message 441 is one of many computer disk file formats suitable for storing recorded sounds, such as spoken messages, in a digital form.

Turning now to another sort of rule that would be appropriate for use with the instant invention, Rule 432 is designed to allow the presentation of an alternate product chosen from the same group or class of products as that selected by the consumer. This decision rule offers a different selection from the "C" column of keypad 117 (FIG. 1), whenever the original section was from the "C" column, and when the alternative has a higher profit margin. Items within the same keypad 117 column will typically be the same type of product, e.g., beverages, or snacks. Thus, if the customer originally selected a beverage, a different beverage would be offered in the alternative, provided, of course, that the alternate beverage had a higher profit margin. Similarly, if the original selection had been a snack, an alternate snack would be offered, the alternative being selected so as to yield a higher profit for the vending machine operator. If the original product selection had a higher profit margin than the designated alternatives, under this rule the selected product would be immediately dispensed. Finally, the suggested message text 442 ("WHY NOT TRY BRAND ⊔INSTEAD? JUST PRESS C ⊔") could be presented to the consumer via any display device suitable for the display of textual and/or graphical material. The underscores in the previous message represent empty fields that would be filled in by the CPU 126 to communicate the message implicated by the previous rule.

Rule 433 illustrates a situation that might arise when the vendor seeks to reduce the inventory of a product that is overstocked relative to other products in the machine 100. More particularly, presentation of the alternate offer message 443—which is an Mpg file, in this instance—will occur if the proposed alternative has some particular amount of inventory remaining (greater than five units remaining in the instant example). The particular alternate product chosen might be fixed, or one that is determined dynamically based on currently available stock in the machine, e.g., the product within the class of designated alternative products that has the greatest remaining inventory.

Turning now to rule 434 of FIG. 4, this rule provides an example of how decision rules can be dynamically modified to respond to local demand fluctuations. In the instant example, an alternate product will be offered if the originally selected product is in "high" demand, where "high" is, of course, subject to a broad range of interpretation. Rule 434 indicates that an alternative will be offered if the demand rate of the originally selected product is greater than one unit sold per five hour interval. The effect of this sort of rule is to preserve the existing inventory of a high-demand product by directing some of its sales toward other items. This would help preserve the existing high-demand inventory for the brand-loyal consumers, who may refuse to purchase anything at all if the selected product is not available. Additionally, a rule of this sort could tend to equalize the demand across the alternate products, and could reduce the number of instances where a vending machine operator is forced to travel to a machine to replenish the inventory of a single out-of-stock item.

Rule 435 is designed to help remedy a situation that is the reverse of rule 434. In this case, an alternate product is offered or not depending on the demand rate (cell 435) of the alternate product. This sort of rule could be used to stimulate the sale of slow-moving product items—i.e., those items having a demand rate that is "low" by some measure. In the instant example, after the consumer has manifested his or her intent to purchase a product, an alternate product that has a low demand rate (e.g., an average of less than one item sold per 17 hour period) will be selected for presentation. Of course, there are many ways that the alternate product might be chosen, but in the preferred embodiment under this rule the product having the lowest demand rate within the class of allowed alternatives will be presented to the customer.

Rule 436 is evaluated by reference to the product expiration or restock dates of the originally requested and alternate products. In the preferred embodiment, if the selected product has a later expiration date (i.e., a longer time until expiration) than a potential alternative, the alternative will be presented to the consumer by way of a message similar to product offer message 446. Of course, the vending machine might contain products with a variety of expiration dates, in which case the preferred approach would be to select as an alternate product the product with the earliest expiration date (i.e., the least time until expiration), although other variations of this approach are certainly possible. Additionally, and as is well known to those skilled in the art, it is not uncommon for items of the same product type to have differing expiration dates. In that case, it would be preferable to use the expiration date of the next vendible item for purposes of the previous rule. This assumes, of course, that the next vendible item has the earliest expiration date among those items having different expiration dates (i.e., the next item to be vended is the oldest item). This may or may not be the case in practice, and it should be clear how the previous approach could be modified to accommodate that situation.

As another example, Rule 437 is designed to help reduce the inventory of items that are nearing the end of their shelf life as measured by the product expiration date. This rule differs from the previous rule 436 in that only the expiration date of the alternate product is considered. That is, rule 437 illustrates a case where the decision to offer an alternate product hinges solely on the number of days until expiration of the alternate product, rather than the number of days until expiration of the originally selected product.

Finally, Rule 438 can be used where the operator seeks to capitalize on the tendency of customers to accept the alternate product offer. Rule 438 is satisfied if the acceptance rate of the alternate product—when offered in combination with the original product selection—is greater than some predetermined value, here greater than 90%. So, an alternate product will be offered under this rule only if customers have traditionally tended to accept the alternative. In the preferred embodiment, the acceptance rate is a parameter that is loaded into each vending machine from a remote computer via network connection 119. This parameter could reflect local, regional, or national alternate selection experience and might be compiled from many thousands of vending machine transactions. Of course, it is possible that each machine could separately estimate an acceptance rate value based on its own "experience" in offering alternative pairs of products, and this sort of arrangement has been specifically contemplated by the instant inventors. Note, however, that if there are "N" products that might be offered as alternatives, a full complement of historical acceptance rates covering all possible product offer combinations would require the specification of N(N−1)/2 rates. Since it might require a very long period of time for an individual vending machine to collect reliable acceptance data on all possible combinations of alternate products, it might be preferable to supply this information to the vending machine as a fixed parameter.

Turning now to some additional types of rules not illustrated in FIG. 4, rules can be formulated that utilize the clock 132 to fashion lunch time, weekend, holiday, and/or time limited promotional rules. By way of example, eggnog could be offered as an alternative for any choice during the holiday season; coffee might be suggested during cold-weather months; or certain alternate products could be offered on a time-limited basis for test marketing or promotional purposes.

As a further example, a vending machine owner might want to encourage the purchase of one product brand over another. For example, if Brand B is offering a financial incentive to sell its products, the vending machine owner might wish to formulate a rule that would always offer a comparable product manufactured by Brand B if a Brand C product were selected by the customer. A representative message presented to a customer who chose a Brand C selection, might read something similar to "WHY NOT TRY A BRAND B PRODUCT RATHER THAN A BRAND C PRODUCT?" This message would be presented each time a customer selected a Brand C product.

Note that in the previous examples, the price of the product to the consumer has been regarded as fixed, however, that need not always be the case. The vending machine operator may wish to manipulate the price of an alternate product to increase its attractiveness to the customer, and the instant rule-based system provides an easy way to accomplish this end. Of course, this might be done any number of ways, but in the preferred embodiment the product offer message would include an offer for a discount on the alternate product. For example, if the customary price of item C3 is $0.75, the alternative product offer message might read as follows:

"WHY NOT TRY BRAND B AT $0.65 INSTEAD? JUST PRESS C3"

Clearly the offer message associated with any rule could be similarly modified. It should be noted that in the preferred embodiment, the discount will not be revealed until the customer actually makes a product selection. Thus, the customer who initially selects the alternate product (C3 in the current example) will pay full price.

Other price-related rules are also possible and have been contemplated by the instant inventors. For example, consider a rule that is dependent on the amount of money tendered by the customer. In those instances where the customer has tendered an amount in excess of the price of the selected product (e.g., if one dollar has been deposited for a $0.75 item) the machine might be programmed to suggest a more expensive alternative, thereby returning less (or no) change to the customer if the offer is accepted. The alternate product might even be one that sells for more than the excess amount tendered, in which case the customer would typically be asked to deposit additional money or, depending on the precise nature of the controlling rule, given the opportunity to purchase the alternate product for an amount equal to the amount of money already deposited into the machine, such that the customer will be offered a discount for the purchase of the alternate item.

There are many more variations of the above rules than could possibly be listed herein and the previous examples have been selected only to illustrate a few ways that alternate product offer rules can be fashioned to help a vendor maximize the profit obtained from a vending machine. Clearly, one of ordinary skill in the art could devise many other sorts of such offers that are within the spirit and scope of the present invention.

More Complex Alternate Product Offer Rules

The previous text has been largely concerned with product offers and associated rules that involve only a single alternate product. Obviously, many variations and extensions of this approach are possible. For example, it should be clear that more than one alternate product might be offered in series to the customer. For example, if the customer declines the first alternate product offer, a second alternative could be presented, followed by a third, etc. However, that strategy would need to be balanced against the tolerance of the customer to such presentations: customer frustration might be expected to limit the number of sequential alternatives that could reasonably be presented. Also, such a strategy would need to be balanced against the increase in time that it would take to serve customers: subsequent customers waiting for the first customer to finish might get frustrated if the offers takes a long time to choose an offer.

As another example, more than one alternative product could be presented in a single product offer message. (This sort of offer might read something like "HOW ABOUT TRYING A OR B INSTEAD.") Customer responses to this multiple offer would preferably be handled as described previously in connection with single product offers.

Note that it is also possible to modify some of the "simple" rules suggested previously, by conditioning the offer on the status of a second variable, thereby creating "composite" rules. For example, a decision rule that would normally direct customers away from products whose inventory is running low might be modified to additionally consider the demand rate for that product. Consider the following broad rule that might be applicable to all products: offer an alternate product if the inventory for the originally selected product is fewer than five items. That rule might be modified to consider the demand rate (and/or restocking) date for the selected item. Thus, if the customer selects a product that has a low demand rate (say, 1 item per week) and a low inventory (say, four items), it might be best to dispense the originally selected product without presenting an alternative. Similarly, the expiration date of the originally selected product might dictate that it should be dispensed without presenting an alternative product in spite of the fact that its inventory is low. This strategy would be appropriate if, for example, expiration were scheduled to occur the next day. This is because it is generally preferable to sell out of the product, rather than to have to discard the expired inventory items.

Another composite rule that could be useful in some circumstances involves modification of the rule that calls for a switch to a "lower" demand product if the originally selected product is in "high" demand. In some cases, a broad rule based on this criterion should be modified by considering the demand rate and/or current inventory of the proposed alternate product: it may not make sense in some cases to offer a predetermined alternate product if the alternative is also a high demand product, albeit slightly lower in demand than the originally selected product. So, one possible modification of the broad rule would be to select the product with the lowest demand rate among some set of feasible alternatives. However, if the inventory of the proposed alternate product is nearly depleted, it might make sense to select still another alternative (or give the customer the originally selected product) rather than offer the product that the associated rule originally called for.

Another sort of decision rule that could prove to be useful in some cases is a "simple" rule that operates on systematically adjusted parameter values. For example, consider a case where the profit margin of an item is varied according to the number of days until its expiration date. More specifically, it is contemplated that in some situations it would be advantageous to artificially increase the profit margin of a product as it nears the end of its shelf life, i.e., to inversely link profitability and perishability. This would be done to insure that, in rule comparisons involving profit margin, the near-expiring product would always be offered. This rule could be expressed as follows: offer the alternate product if the adjusted profit margin of the alternate product is greater than the profit margin of the original selection. This adjustment could be made in discrete steps or according to a continuous mathematical formula such as:

Adjusted profit margin=profit margin+0.01*(30−number of days till expiration), which will artificially increase the profit margin of this product one cent each day. Of course, each time such an artificial increase is applied, it will make it more likely that this product will qualify for an offer presentation (as compared with fixed profit margin items).

The previous examples have been directed toward situations in which an alternate offer is presented (or is not presented) to the customer and, after the customer receives the merchandise, the transaction ends. However, this same rule-based framework may be used to influence future transactions as well. For example, the previous logic may readily be modified to offer a customer an incentive to purchase a specified product in the future in exchange for the customer's purchase of the alternate product. In the preferred embodiment, the incentive would be a financial one, involving a discount on a future purchase. In the event that the incentive is a future discount, this sort of operational logic may be compactly represented as follows:

```
Select a RULE associated with the original selection;
Evaluate the RULE;
If the conditions of RULE are satisfied, then
    Offer an alternate product and a future discount;
    Obtain customer's response to the offer;
    Dispense the product chosen by the customer; and,
    If the alternate product was chosen, then
        Authorize a future discount;
    END IF
ELSE
    Vend the product originally requested;
END IF.
```

This scheme might be implemented by providing the customer with an alphanumeric coupon code that would be manually entered into the vending machine at a later date in order to redeem the discount. In the preferred embodiment, the offer would be expiring and would include an indication of the expiration date embedded within the code itself, so that a database of such offers need not be maintained, although maintenance of such a database would certainly be possible and feasible. In one embodiment, the vending machine might write the details of the transaction on a magnetic-strip coupon that could be redeemed at a future time by tendering that item to a vending machine designed to read it. Magnetic-strip coupons such as those sold by Coins under the trademark MAG Coupon would suitable for use with this embodiment.

Preconditions, Overriding Rules, And Default Rules

A vending machine operator might wish to formulate certain rules that would be considered before, or as a part of, every decision rule evaluation. An example of such a rule would be one that considered the availability of the alternate product. That is, an alternate product should not be offered to the customer if the alternative is out of stock in this machine. In order to implement this rule, the usual alternate offer evaluation sequence would preferably be modified as follows:

```
Choose a RULE associated with the original product selection;
Determine the quantity of alternate product items available;
If the quantity is greater than a predetermined value
    Evaluate the RULE and interact with the customer as
        described previously;
ELSE
    Select another alternate product, or
    Vend the originally requested product.
END IF.
```

Thus, availability of the alternate product has been made a precondition to evaluating the selected decision rule. So, if a decision rule would otherwise call for a particular alternative, that alternative will not be presented if it is out of stock.

Additionally, it might be desirable in some settings to formulate an overriding rule that offers a specific alternative no matter what the original selection. In the preferred embodiment, every product in the machine or every designated alternative to the selected product (where the designated alternatives are specified by the vending machine operator) would be implicated by this sort of rule. During the time that an overriding rule is in effect, other rules would be preempted. In most cases, this sort of rule would be limited in time and the vending machine would return to normal rule-based operations on a predetermined future date. As an example of when this sort of rule might be useful, consider the situation where a vending machine contains one or more items of product type A having expiration dates that are imminent. The operator could create an overriding rule that resulted in an offer for product A as an alternate product, no matter what the original selection by the customer. However, this sort of rule would typically be time-limited and the vending machine would typically return to its normal alternate offer rules after all of the product A items had been vended or after the expiration date had passed.

Finally, in some cases a product will not qualify for any specific alternate product offer. In those cases, the vending machine could be programmed to select a default rule/offer combination. Clearly, any rule discussed previously could be designated by the vending machine operator as a default rule. Additionally, though, it will be assumed hereinafter that a "null" rule is always available if an original product selection does not qualify for an alternate offer. A null rule is defined to be associated with every possible initial product selection and is a rule is one that is always "false" when evaluated. Said another way, if the null rule applies, an alternate product offer will never be presented to the customer (i.e. Step 515 of FIG. 5 will always take the "NO" branch if the null rule is evaluated). Of course, the null rule is a "rule of last resort" and will only be the chosen rule if there is no other associated rule. In effect, the null rule may also be thought of as the unconditional directive to the CPU 126 to vend (step 550) the originally selected product.

Invention Database

As should be clear in light of the foregoing, the resolution of many of the decision rules suggested in FIG. 4 requires a knowledge of one or more parameters relating to the vending machine inventory and/or its general operating environment. In the preferred embodiment, this information will be stored within an inventory database 300 (FIG. 2) where it can be accessed by the CPU 126. FIG. 3 has been provided to illustrate some of the various sorts of information that might be stored within this database. The product dispenser identifier field 320 allows the microprocessor 126 to match product selections with other information about the product (e.g., its name, its cost, etc.), and the product dispenser identifier 320 represents the keypad signal corresponding to each corresponding product identified in field 310. Other arrangements and variations are certainly possible.

Additionally, the cost 330 to the vending machine operator of each product type and the cost of that product to the consumer (i.e., the price 340 of the product) are also preferably stored within the inventory database 300. These two values could be used to calculate the profit margin of a product as mentioned previously in connection with Rule 432. However, the profit margin could also be determined by the vending machine operator and stored within the database 300 as a separate parameter.

It is further preferred that some indication of the expiration and/or a restocking date 370 of each product will be stored within database 300. In the case of an expiration date parameter, it is preferred that at least the expiration date of the items that will soonest expire be maintained in the database 300. Note that, in conventional usage an expiration date differs from a restocking date in that a product must be discarded or sold as distressed after its expiration date, whereas a restocking date is normally the next scheduled date when the stock of the vending machine will be replenished. Of course, the values of these two parameters might actually be the same date. However, in other cases they will not be the same, and it might be desirable in those cases to maintain separate database fields for these two parameters. In either case, the current date (as provided, for example, by clock 132) can be used together with the expiration/restocking date parameter 370 to determine how many days remain until the respective event for purposes of rule evaluation. For example, in FIG. 3, if product SNACK 1 (cell 314) was originally stocked on Jan. 20, 1999 and the known expiration interval was 31 days for that type of good, the expiration date could be directly calculated to be Feb. 20, 1999 as is illustrated in cell 374. Clearly, the expiration interval for each type of product could also be readily be made a part of the inventory database 300.

Another parameter that is preferably maintained within the database 300 is the quantity remaining of each product 360. As has been discussed previously, this parameter can be used to determine whether or not an alternate product offer should be presented to the customer. In the preferred embodiment, this database field will be updated by the microprocessor each time a product is dispensed. Of course, when items are added to the vending machine 100 field 360 of the appropriate records are adjusted accordingly. Whether the inventory database 300 is updated automatically or manually when new products are added to the machine is immaterial to the operation of the instant invention and it is well within the ability of one of ordinary skill in the art to devise methods of keeping this database 300 current and accurate.

Still another preferred entry in the database 300 is some estimate of the current demand rate 350 for each type of product in the machine. As used herein, demand rate indicates the quantity of goods sold per unit of time. For example, in FIG. 3, the demand rate in column 350 corresponding to "SNACK 1" is one unit sold per twelve hour period (cell 354). In the preferred embodiment, this value is computed by the CPU 126 using the database 300 to measure inventory changes and the clock 132 to determine the time interval between sales. This approach has the advantage of being responsive to circumstances specific to a particular vending machine. However, it might also be desirable in some applications (say, where there is a cluster of vending machines or where a route of vending machines is being managed) to have the demand rate determined for an entire region by the vending machine operator (or by a central computer). This would allow the vending machine owner to optimize the sales performance of an entire vending machine network, at the possible expense of a few individual machines.

Finally, it should be noted that the inventory database 300 and the alternate product offer database 220 (discussed hereinafter) need not be hierarchical databases, but could instead be simple sequential listings of information (e.g., so-called "flat file" databases). Thus, the term "database" should be construed in its broadest sense to include any arrangement of information containing information that can be accessed by the CPU 126.

Resolving Rule Conflicts

It is certainly possible—and this prospect has been specifically contemplated by the instant inventors—that a product might qualify for multiple alternate product offers. For example, the originally selected product might be (1) in high demand and qualified for an offer suggesting a lower demand item, and also (2) a low margin product that would qualify for an offer presenting a different higher margin alternative. Clearly, there are any number of ways to resolve this situation. For example, when a product qualifies for multiple alternate offers all products that so qualify might be presented either in a single offer (e.g., "HOW ABOUT A OR B OR C INSTEAD?") or one of the alternatives could be selected and presented (e.g., select the product with the highest profit margin). Clearly, many variations are possible and are within the spirit and scope of the present invention.

Another approach would randomly select from among the available alternatives and present the one offer so selected. This approach would have the advantage of spreading the alternate product offers among several products and reduce the risk of causing a single product to experience a rapid decrease in inventory. It would also make it possible to "surprise" the consumer, as he or she might be offered a different alternative each time the same preferred product was selected. Additionally, the next person standing in line might receive a different alternate offer than was presented to the person before him or her. This approach would also help guard against automatic responses by frequent users of a particular vending machine. In a similar vein, a rule could be devised that calls for drawing from a list of associated alternate product offers in a sequential (rather than random) fashion. This approach would help insure that each product is at least occasionally made the subject of an alternate product offer.

Finally, a rule selection hierarchy may be established that provides a systematic way for the CPU 126 to choose among a plurality of qualifying alternate product offers. In brief, the central idea is that some rules will be designated as being dominant over others. Consider one example of such a rule: if a product qualifies for two alternate product offers, select the alternate product with the higher profit margin. Meat-rules such as this can be used to form a rule selection hierarchy, which permits the CPU 126 to automatically choose one decision rule from among a plurality of qualifying rules according to the needs and wishes of the vending machine operator. A variant of this approach would be to allow scores or weights to be assigned to each rule in the database. This would make it possible for the CPU 126 to select between the qualifying rules on the basis of quantitative criteria established by the owner.

It should be noted, however, that the term "rule selection hierarchy" will be broadly interpreted herein to mean any method by which the CPU 126 can be directed to select among multiple qualifying alternate product offers. This definition would include random and sequential selection as described above.

CONCLUSION

Although the previous language has been couched generally in terms of decision rules as applied to a single vending machine, it should be noted that the instant methods are applicable to networks of vending machines. By formulating rules that are applied within every machine in a network, a vending machine operator may even devise global strategies for increasing the profits obtained from their sales.

Additionally, given the widespread availability of wireless and land-based communications pathways, it should be apparent that multiple vending machines could be controlled by a single CPU 126 situated in a location remote from the vending site. In that case, there may be additional interconnections (not shown) between the CPU 126 and the other vending machines to read from and/or control change dispensers 118, bill reader/validates 114, item dispensers 122, output devices 124, etc. Further, the communications links illustrated in FIG. 2 between the CPU 126 and the various devices that it reads and/or controls could be made via network connections, allowing the CPU 126 to be potentially located anywhere in the world. Design of such an arrangement would be well within the ability of one of ordinary skill in the art.

Thus, it is apparent that there has been provided, in accordance with the invention, a vending machine system and apparatus that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method of operating a vending machine capable of dispensing multiple types of goods, comprising the acts of:
    receiving, by the vending machine, a user input to receive a selected good;
    receiving, via the vending machine, compensation for the selected good;
    making a determination, by the vending machine, between the selected good and at least one alternative good dispensable by the vending machine, such determination based at least in part on one property of each of the goods, wherein the at least one property comprises relative expiration dates of the selected good and the alternative good;
    offering, via the vending machine, the alternative good to the user; and
    dispensing, by the vending machine, at least one of the selected good and the alternative good to the user.

2. The method of claim 1, further comprising the step of:
    receiving a user input to the offer of the alternative good, and wherein the dispensing step is performed in accordance with such user input.

3. The method of claim 1, wherein the step of making a determination is performed at least in part through a microprocessor associated with the vending machine.

4. The method of claim 3, wherein the microprocessor is within the vending machine.

5. The method of claim 3, wherein the microprocessor is located remotely from the vending machine.

6. The method of claim 3, wherein the microprocessor is in communication with a database comprising data identifying at least one property of at least selected goods dispensable by the vending machine and available for vending; and wherein the act of making a determination between the selected good and at least one alternative good comprises the act of the microprocessor accessing the database as to at least that one property.

7. A method of operating a vending machine capable of dispensing multiple types of goods, comprising the acts of:
    receiving, by the vending machine, a user input to receive a selected good;
    receiving, via the vending machine, compensation for the selected good;
    making a determination, by the vending machine, between the selected good and at least one alternative good dispensable by the vending machine, such determination based at least in part on one property of each of the goods, wherein the at least one property comprises profit margins on the selected good and the alternative good;
    offering, via the vending machine, the alternative good to the user; and
    dispensing, by the vending machine, at least one of the selected good and the alternative good to the user.

8. A method of vending machine operation, comprising the acts of:
    receiving, by the vending machine, a user input to receive a selected good;
    receiving, by the vending machine, compensation for the selected good;
    offering, by the vending machine, a substitute good dispensable by the machine in place of the selected good, such offering performed in response to at least one property associated with individual goods of at least some types of good dispensable by the machine, wherein the at least one property associated with individual goods of at least some types of good dispensable by the machine, is within the group of properties consisting essentially of:
    the expiration dates on the selected good and the substitute good;
    the profit margins on the selected good and the substitute good;
    the user demand rates for the selected good and the substitute good;
    the inventory volumes of the selected good and the substitute good dispensable by the machine;
    incentives for sales of the substitute good; and
    promotions for the substitute good;

offering, by the vending machine, the substitute good to the user;

receiving, by the vending machine, a user input to the offer of the substitute good; and dispensing, by the vending machine, at least one of the selected good and the substitute good to the user in accordance with such user input.

9. The method of claim 8, further comprising the act of:

determining whether to offer a substitute good in place of the selected good, and wherein such act of determining is performed at least in part within the vending machine.

10. The method of claim 8, further comprising the act of:

determining whether to offer a substitute good in place of the selected good, and wherein such act of determining is performed remotely from the vending machine.

11. The method of claim 10, wherein the act of determining is performed after receipt of the user input to receive a selected good.

12. A method of vending machine operation, comprising the acts of:

receiving, by the vending machine, a user input to receive a selected good;

receiving, by the vending machine, compensation for the selected good;

offering, by the vending machine, a substitute good dispensable by the machine in place of the selected good, such offering performed in response to at least one property associated with individual goods of at least some types of good dispensable by the machine, wherein the property associated with individual goods of at least some types of good dispensable by the machine comprises the user demand rate for each of the selected good and the substitute good, and wherein those user demand rates are determined in reference to at least one demand rate from a vending machine other than the one offering such substitute good;

offering, by the vending machine, the substitute good to the user;

receiving, by the vending machine, a user input to the offer of the substitute good; and dispensing, by the vending machine, at least one of the selected good and the substitute good to the user in accordance with such user input.

13. A method of operating a plurality of vending machines under common control from a remote location, each such vending machine configured to dispense goods, comprising the acts of:

making a first determination to offer an alternate good to a first user in place of a good selected by that first user to be received from a first vending machine within said plurality of vending machines;

presenting the offer of the alternate good at the first vending machine;

making a second determination to offer an alternate good to a second user in place of a good selected by that second user to be received from a second vending machine within said plurality of vending machines; and presenting the offer of the alternate good at the second vending machine.

14. The method of claim 13, wherein each of said first and second determinations are made in response to a property associated with the selected good and the respective alternate good; and wherein an individual property used in said first and second determinations is within the group consisting essentially of:

the expiration dates on the selected good and the alternate good, the profit margins on the selected good and the alternate good, the user demand rates for the selected good and the alternate good, the inventory volumes of the selected good and the alternate good dispensable by the machine, incentives for sales of the alternate good, and promotions for the alternate good.

15. The method of claim 13, wherein the first and second determinations are made at a single location.

16. The method of claim 13, wherein the first determination is made in response to the selection of the selected good by the first user.

17. The method of claim 13, wherein the determination to offer the alternate good in response to a selection of the selected good is made in advance of the actual selection by the first user.

18. A method of operation of a vending machine which dispenses goods in response to user input and payment, comprising the acts of:

making a determination, by the vending machine, that in the event of a customer selection of at least one first good, at least one alternate good will be offered to the customer, such at least one alternate good comprising an item of a type similar to that of the first good selected by the customer; and upon receipt of a customer selection of said first good, offering, by the vending machine and to the customer the alternate good in place of the selected good, wherein the act of making a determination is performed in response to the selection of said first good by the user.

19. The method of claim 18, further comprising the acts of:

receiving a user input in response to the offer; and dispensing a good to the customer in response to such user input.

20. A method of operation of a vending machine which dispenses goods in response to user input and payment, comprising the acts of:

making a determination, by the vending machine, that in the event of a customer selection of at least one first good, at least one alternate good will be offered to the customer, such at least one alternate good comprising an item of a type similar to that of the first good selected by the customer, wherein the act of making a determination that in the event of a customer selection of a first good, at least one alternate good will be offered to the customer comprises the act of:

determining, by the vending machine, that multiple alternate goods will be offered to the customer, wherein at least one of said alternate goods is of the same type as that of the first good; and upon receipt of a customer selection of said first good, offering, by the vending machine and to the customer the alternate good in place of the selected good.

21. The method of claim 20, wherein the act of making a determination is performed prior to the selection of said first good by the user.

22. A method of operation of a vending machine which dispenses goods in response to user input and payment, comprising the acts of:

making a determination, by the vending machine, that in the event of a customer selection of at least one first good, at least one alternate good will be offered to the customer, such at least one alternate good comprising an item of a type similar to that of the first good selected by the customer; and upon receipt of a customer selection of said first good, offering, by the vending machine, to the customer the alternate good in place of the selected good, wherein the first good selected by the customer is a beverage and wherein the alternate good is a beverage.

23. A method of operation of a vending machine which dispenses goods in response to user input and payment, comprising the acts of:
making a determination, by the vending machine, that in the event of a customer selection of at least one first good, at least one alternate good will be offered to the customer, such at least one alternate good comprising an item of a type similar to that of the first good selected by the customer; and
upon receipt of a customer selection of said first good, offering, by the vending machine, to the customer the alternate good in place of the selected good, wherein the good selected by the customer is a snack and wherein the alternate good is a snack.

24. A method of operation of a vending machine which dispenses goods in response to user input and payment, comprising the acts of:
making a determination, by the vending machine, that in the event of a customer selection of at least one first good, at least one alternate good will be offered to the customer, such at least one alternate good comprising an item of a type similar to that of the first good selected by the customer; and
upon receipt of a customer selection of said first good, offering, by the vending machine, to the customer the alternate good in place of the selected good, wherein the customer selection is a default selection resulting from a failure to directly respond to the offer within an applicable time period.

25. A method of operation of a vending machine which dispenses goods in response to user input and payment, comprising the acts of:
making a determination, by the vending machine, that in the event of a customer selection of at least one first good, at least one alternate good will be offered to the customer, such at least one alternate good comprising an item of a type similar to that of the first good selected by the customer, wherein the act of making a determination is performed to offer first and second alternate goods to the customer in place of the good selected; and
upon receipt of a customer selection of said first good, offering, by the vending machine, to the customer the alternate good in place of the selected good.

26. The method of claim 25, wherein the first and second alternate goods are offered to the customer in the alternate.

27. The method of claim 25, wherein the first and second goods are offered to the customer in combination.

28. A method of controlling operation of a vending machine which dispenses goods in response to user input and tender of payment, comprising the acts of:
making a determination, by the vending machine, that in the event of a customer selection of at least one good, an alternate good will be offered to the customer, such determination being based at least in part on data of previous transactions, such data comprising information associated with the frequency of acceptances of a particular alternate good in place of the selected good; and
upon receipt of a customer selection of said at least one good, offering, by the vending machine, the alternate good to the customer in place of the selected good.

29. A method of controlling operation of a vending machine which dispenses goods in response to user input and payment, comprising the act of making, by the vending machine, a determination that in the event of a customer selection of a first good at said vending machine, a substitute good will be offered to the customer, the determination made at least partially in response to a comparison of the profit which results from sale of the first good relative to the profit which results from sale of the substitute good.

30. The method of claim 29, further comprising the acts of:
receiving a customer selection of said first good; and
offering to the customer the substitute good in place of the selected good.

31. A method of operating a vending machine which dispenses goods in response to user input and payment, comprising the acts of:
making a determination, by the vending machine, that in the event of a customer selection of a first good at said vending machine, a substitute good will be offered to the customer at a price different from the price for the first good;
receiving, by the vending machine, a customer selection of the first good;
receiving, by the vending machine, a customer tender of payment for the first good;
presenting, by the vending machine, to the customer the offer of the substitute good at the different price;
determining, by the vending machine, a selection between the first good and the substitute good; and
dispensing, by the vending machine, a good to the customer based upon the determined selection.

32. The method of claim 31, wherein the act of making a determination is performed after and in response to the act of determining a selection between the first good and the substitute good.

33. The method of claim 31, wherein the act of determining a selection is performed in response to the absence of a user input in regard to the offer.

34. The method of claim 31, wherein the different price of the substitute good is lower than the price of the first good; and wherein in the event of a user selection of the substitute good, the substitute good is dispensed to the customer, along with compensation for the difference between payment tendered by the customer and the lower price of the substitute good.

35. The method of claim 34, wherein the compensation is in money, and wherein the method further comprises dispensing such money from the machine.

36. The method of claim 31, wherein the vending machine comprises a card reader, and payment is tendered by the customer through such card reader.

37. The method of claim 36, wherein the payment is tendered by the customer through a card selected from the group consisting essentially of smart cards, debit cards and credit cards.

38. The method of claim 31, wherein the act of receiving a customer tender of payment for the first good comprises receiving tender of payment in excess of the purchase price of the first good; and wherein the substitute good is offered at a price greater than the price of the first good.

39. A machine-readable medium containing instructions which, when executed by one or more processors, perform operations comprising:
accessing a database of rules relating to offering goods by a vending machine in place of goods selected to be dispensed by a vending machine by a user of the machine; and
determining at least one substitute good to be offered to a user in the event of a selection of a first good in accordance with at least one rule from the database, wherein the operation of determining a substitute good is performed relative to inventory information of goods which are located within a single vending machine.

40. The machine-readable medium of claim 39, wherein the operations further comprise accessing a database of inventory information of parameters of goods which may be vended; and wherein the operation of determining a substitute good is further performed in reference to such inventory information.

41. A machine-readable medium containing instructions which, when executed by at least one processor, perform operations comprising:
    accessing a database of rules relating to offering goods by a vending machine in place of goods selected to be dispensed by a vending machine by a user of the machine;
    accessing a database of inventory information of properties associated with goods which may be vended by the vending machine, wherein the operation of accessing the database of inventory information of properties associated with goods which may be vended by the vending machine is performed in part by accessing the database wherein the inventory information contains properties associated with goods comprising at least one property selected from the group consisting essentially of:
    expiration dates on the selected good and the substitute good:
    profit margins on the selected good and the substitute good;
    user demand rates for the selected good and the substitute good;
    inventory volumes of the selected good and the substitute good dispensable by the machine;
    incentives for sales of the substitute good; and
    promotions for the substitute good;
    determining at least one substitute good to be offered to a user in place of a first good, in the event of a selection of the first good in accordance with at least one rule from the database;
    processing a user selection for the first good to be dispensed; and
    offering the determined substitute good to the user in place of the first good.

42. The machine-readable medium of claim 41, wherein the operations of accessing the rules database, accessing the inventory information database, and determining a substitute product, are performed in response to the operation of processing a user selection.

43. A method, comprising:
    receiving, by a vending machine, an indication of a product selected for purchase by a customer;
    determining, after the receiving and by the vending machine, a substitute product to offer the customer instead of the selected product, wherein the substitute product is determined based on a comparison of an expiration date of the substitute product and an expiration date of the selected product;
    outputting, by the vending machine, an offer for the substitute product;
    determining, by the vending machine, which one of the selected product and the offered substitute product the customer selects to purchase; and
    dispensing, by the vending machine, the one of the selected product and the offered substitute product determined to have been selected by the customer for purchase.

44. The method of claim 43, wherein (i) the substitute product comprises a plurality of substitute products, (ii) wherein the outputting of the offer for the plurality of substitute products comprises displaying a menu of the plurality of substitute products, and (iii) further comprising, in the case that it is determined that the customer selects one of the plurality of substitute products for purchase:
    determining which one of the plurality of substitute products is selected by the customer for purchase.

45. The method of claim 43, wherein the comparison of the expiration date of the substitute product and the expiration date of the selected product, comprises:
    determining which of the selected product and the substitute product has the earliest expiration date.

46. The method of claim 45, wherein the comparison of the expiration date of the substitute product and the expiration date of the selected product, further comprises:
    determining that the substitute product has the earliest expiration date.

47. A method, comprising:
    receiving, by a vending machine, an indication of a product selected for purchase by a customer;
    determining, after the receiving and by the vending machine, a substitute product to offer the customer instead of the selected product, wherein the substitute product is determined based on a comparison of an inventory level of the substitute product and an inventory level of the selected product;
    outputting, by the vending machine, an offer for the substitute product;
    determining, by the vending machine, which one of the selected product and the offered substitute product the customer selects to purchase; and
    dispensing, by the vending machine, the one of the selected product and the offered substitute product determined to have been selected by the customer for purchase.

48. The method of claim 47, wherein (i) the substitute product comprises a plurality of substitute products, (ii) wherein the outputting of the offer for the plurality of substitute products comprises displaying a menu of the plurality of substitute products, and (iii) further comprising, in the case that it is determined that the customer selects one of the plurality of substitute products for purchase:
    determining which one of the plurality of substitute products is selected by the customer for purchase.

49. The method of claim 47, wherein the comparison of the inventory level of the substitute product and the inventory level of the selected product, comprises:
    determining which of the selected product and the substitute product has the highest inventory level.

50. The method of claim 49, wherein the comparison of the inventory level of the substitute product and the inventory level of the selected product, further comprises:
    determining that the substitute product has the highest inventory level.

51. A method, comprising:
    receiving, by a vending machine, an indication of a product selected for purchase by a customer;
    determining, after the receiving and by the vending machine, a substitute product to offer the customer instead of the selected product, wherein the substitute product is determined based on a comparison of a sales rate of the substitute product and a sales rate of the selected product;
    outputting, by the vending machine, an offer for the substitute product;
    determining, by the vending machine, which one of the selected product and the offered substitute product the customer selects to purchase; and dispensing, by the vending machine, the one of the selected product and the offered substitute product determined to have been selected by the customer for purchase.

52. The method of claim 51, wherein (i) the substitute product comprises a plurality of substitute products, (ii) wherein the outputting of the offer for the plurality of substitute products comprises displaying a menu of the plurality of substitute products, and (iii) further comprising, in the case that it is determined that the customer selects one of the plurality of substitute products for purchase:

determining which one of the plurality of substitute products is selected by the customer for purchase.

53. The method of claim 51, wherein the comparison of the sales rate of the substitute product and the sales rate of the selected product, comprises:

determining which of the selected product and the substitute product has the slowest sales rate.

54. The method of claim 53, wherein the comparison of the sales rate of the substitute product and the sales rate of the selected product, further comprises:

determining that the substitute product has the slowest sales rate.

55. A method, comprising:

receiving, by a vending machine, an indication of a product selected for purchase by a customer;

determining, after the receiving and by the vending machine, a substitute product to offer the customer instead of the selected product, wherein the substitute product is determined to be a product similar to the selected product and wherein the substitute product is further determined based on a comparison of a profitability of the substitute product and a profitability of the selected product;

outputting, by the vending machine, an offer for the substitute product;

determining, by the vending machine, which one of the selected product and the offered substitute product the customer selects to purchase; and dispensing, by the vending machine, the one of the selected product and the offered substitute product determined to have been selected by the customer for purchase.

56. The method of claim 55, wherein (i) the substitute product comprises a plurality of substitute products, (ii) wherein the outputting of the offer for the plurality of substitute products comprises displaying a menu of the plurality of substitute products, and (iii) further comprising, in the case that it is determined that the customer selects one of the plurality of substitute products for purchase:

determining which one of the plurality of substitute products is selected by the customer for purchase.

57. The method of claim 55, wherein the comparison of the profitability of the substitute product and the profitability of the selected product, comprises:

determining which of the selected product and the substitute product has the highest profitability.

58. The method of claim 57, wherein the comparison of the profitability of the substitute product and the profitability of the selected product, further comprises:

determining that the substitute product has the highest profitability.

* * * * *